US012594662B2

(12) United States Patent
Cariello

(10) Patent No.: US 12,594,662 B2
(45) Date of Patent: Apr. 7, 2026

(54) HANDLE FOR HOLDING DISPENSER

(71) Applicant: Donna Cariello, Levittown, NY (US)

(72) Inventor: Donna Cariello, Levittown, NY (US)

( * ) Notice: Subject to any disclaimer, the term of this patent is extended or adjusted under 35 U.S.C. 154(b) by 0 days.

(21) Appl. No.: 18/231,082

(22) Filed: Aug. 7, 2023

(65) Prior Publication Data

US 2024/0100681 A1 Mar. 28, 2024

Related U.S. Application Data

(63) Continuation of application No. 17/523,396, filed on Nov. 10, 2021, now Pat. No. 11,752,614.

(60) Provisional application No. 63/111,876, filed on Nov. 10, 2020.

(51) Int. Cl.
*B25G 1/04* (2006.01)
*B25G 1/10* (2006.01)
*B25G 3/12* (2006.01)

(52) U.S. Cl.
CPC ............... *B25G 1/04* (2013.01); *B25G 1/102* (2013.01); *B25G 3/12* (2013.01)

(58) Field of Classification Search
CPC . B25G 1/04; B25G 1/102; B25G 3/12; B25G 1/06
See application file for complete search history.

(56) References Cited

U.S. PATENT DOCUMENTS 2,146,996 A * 2/1939 Smalley ................... B25G 3/12 403/190
2,264,482 A * 12/1941 Ridner, Sr. ............. A45D 40/28 D28/86
2,456,948 A * 12/1948 Kaye ...................... A45D 40/18 132/316
2,476,866 A * 7/1949 Heyman ................ A45D 40/24 401/32
2,744,278 A * 5/1956 Roth .................... A46B 5/0033 15/185
3,568,237 A * 3/1971 Rhodes .................. A47K 7/028 401/6
4,286,353 A * 9/1981 Roche ........................ E06C 1/32 403/81
4,299,005 A * 11/1981 Brown ................... A47K 7/028 401/262
4,381,766 A * 5/1983 Avolio ................... A47K 7/028 15/210.1
4,571,106 A * 2/1986 Scuderi ................ A45D 34/041 401/209
5,067,836 A * 11/1991 Khan ..................... A45D 40/06 401/78

(Continued)

FOREIGN PATENT DOCUMENTS

JP 2000015151 A 1/2000
JP 3188587 B 7/2001

*Primary Examiner* — William L Miller
(74) *Attorney, Agent, or Firm* — Shore IP Group, PLLC; Sean R. Wilsusen

(57) ABSTRACT

A handle assembly includes a first arm member. The first arm member defines a proximal end and a distal end. A hand-grip is coupled to the proximal end of the first arm member. A second arm member is pivotally coupled with the distal end of the first arm member. The second arm member defines a distal end. A dispenser holding assembly is supported at the distal end of the second arm member. The dispenser holding assembly is configured to hold a dispenser.

16 Claims, 25 Drawing Sheets

(56) References Cited

U.S. PATENT DOCUMENTS

| | | | | | |
|---|---|---|---|---|---|
| 5,435,328 | A * | 7/1995 | Grohoske | A46B 7/08 | 15/171 |
| 5,659,916 | A * | 8/1997 | Beatty | A61M 35/006 | 15/210.1 |
| 5,681,045 | A * | 10/1997 | Liao | A63B 63/004 | 403/92 |
| 5,692,261 | A * | 12/1997 | Lops | A45D 40/26 | D28/7 |
| 5,842,488 | A * | 12/1998 | Belleau | A46B 5/0033 | 132/320 |
| 5,851,077 | A * | 12/1998 | Trejo | A45D 34/041 | 401/6 |
| D408,944 | S * | 4/1999 | Petschow | D28/7 | |
| 6,009,887 | A * | 1/2000 | Hertel | A45D 34/042 | 132/320 |
| 6,026,535 | A * | 2/2000 | Lankowski | A45D 34/04 | 15/210.1 |
| 6,032,321 | A * | 3/2000 | Shirey | B25G 1/06 | 15/144.4 |
| 6,199,245 | B1 * | 3/2001 | Blessing | B25G 1/06 | 16/901 |
| 6,663,305 | B2 * | 12/2003 | Poulos | B43K 23/02 | D19/135 |
| 6,726,385 | B1 * | 4/2004 | Borowski | A46B 11/002 | 401/187 |
| 7,003,849 | B2 * | 2/2006 | Cohen | E05D 11/1007 | 16/436 |
| D518,597 | S * | 4/2006 | Sommers | D24/119 | |
| 7,309,180 | B2 * | 12/2007 | Russell | A61H 7/003 | 401/196 |
| D600,421 | S * | 9/2009 | Hoadley | D32/52 | |
| D609,871 | S * | 2/2010 | Zach | D7/393 | |
| D613,014 | S * | 3/2010 | Hoadley | D32/52 | |
| D614,373 | S * | 4/2010 | Zach | D32/52 | |
| 7,938,291 | B2 * | 5/2011 | Christensen | E04H 4/0056 | 220/666 |
| 7,942,159 | B2 * | 5/2011 | Choi | E04H 15/42 | 135/147 |
| 8,151,828 | B2 * | 4/2012 | Parton | F16L 55/1705 | 137/15.01 |
| 8,226,110 | B2 * | 7/2012 | Liao | B62B 7/064 | 280/47.38 |
| 8,382,727 | B1 * | 2/2013 | Martin | A45D 34/041 | 604/289 |
| D691,731 | S * | 10/2013 | Grippo | A61H 39/04 | D24/215 |
| 8,635,743 | B2 * | 1/2014 | Smith | F16C 11/045 | 16/382 |
| 8,715,252 | B2 * | 5/2014 | Connor | A61M 35/003 | 604/289 |
| 8,967,898 | B1 * | 3/2015 | Dayeh | A47K 7/03 | 401/23 |
| 9,119,456 | B1 * | 9/2015 | Hudson | A45D 34/04 | |
| 9,199,658 | B2 * | 12/2015 | Chuah | B62B 7/06 | |
| 9,597,488 | B1 * | 3/2017 | Jones | B25G 1/10 | |
| 10,820,671 | B1 * | 11/2020 | Chen | B25G 3/12 | |
| 10,898,702 | B2 * | 1/2021 | Beaubien | A45D 34/00 | |
| 11,122,880 | B1 * | 9/2021 | Blackner | A45D 34/04 | |
| 11,272,776 | B2 * | 3/2022 | Gibbs | A46B 11/0037 | |
| 11,291,814 | B1 * | 4/2022 | Swier | B25G 1/102 | |
| 12,414,620 | B1 * | 9/2025 | Skelton | B25G 3/20 | |
| 2004/0244545 | A1 * | 12/2004 | Stinnissen | B25G 1/102 | 254/19 |
| 2005/0201811 | A1 * | 9/2005 | Russell | A45D 34/042 | 401/6 |
| 2008/0173600 | A1 * | 7/2008 | Mungal | A47G 23/02 | 248/363 |
| 2008/0302215 | A1 * | 12/2008 | Johnson | B25B 11/007 | 81/53.12 |
| 2009/0159487 | A1 * | 6/2009 | Tacoma | B25J 1/04 | 15/210.1 |
| 2010/0282767 | A1 * | 11/2010 | Wren | A47G 23/0216 | 220/710.5 |
| 2011/0229244 | A1 * | 9/2011 | Bennett | A45D 40/00 | 401/55 |
| 2011/0311298 | A1 * | 12/2011 | McGee | A45D 40/26 | 401/188 R |
| 2012/0110785 | A1 * | 5/2012 | Hanigan | E05D 3/10 | 16/382 |
| 2014/0081220 | A1 * | 3/2014 | Connor | A61H 15/0092 | 604/289 |
| 2014/0103276 | A1 * | 4/2014 | Fegan | B25G 1/102 | 254/26 R |
| 2017/0113029 | A1 * | 4/2017 | Hernandez | A61M 35/003 | |
| 2017/0334081 | A1 * | 11/2017 | Dryfhout | B26B 21/44 | |
| 2020/0121899 | A1 * | 4/2020 | Fox | A61M 35/003 | |
| 2020/0276723 | A1 * | 9/2020 | Patterson | G01N 1/06 | |
| 2021/0137637 | A1 * | 5/2021 | Noell | A61M 35/003 | |
| 2022/0369787 | A1 * | 11/2022 | Lemmerman | A45D 34/041 | |

* cited by examiner

HANDLE FOR HOLDING DISPENSER

CROSS-REFERENCE TO RELATED APPLICATION

The present application claims the benefit of and priority to U.S. Provisional Application No. 63/111,876, filed Nov. 10, 2020. The entire contents of which are incorporated by reference herein.

FIELD

The present disclosure relates to a handle, and more particularly, to a handle for holding a dispenser.

BACKGROUND

Generally, dispensers such as medication dispensers include a plastic container with an opening at one end to allow access to the dispensed product. For example, a pain relief gel may be housed in a roll-on dispenser with an applicator at one end of the dispenser. However, people may find it difficult to apply such pain relief gel in hard to reach areas, such as a person's back. Thus, assistance may be needed by a second person to apply the pain relief gel to hard to reach areas, such as the person's back.

SUMMARY

Provided in accordance with aspects of the present disclosure is a handle assembly includes a first arm member. The first arm member defines a proximal end and a distal end. A hand-grip is coupled to the proximal end of the first arm member. A second arm member is pivotally coupled with the distal end of the first arm member. The second arm member defines a distal end. A dispenser holding assembly is supported at the distal end of the second arm member. The dispenser holding assembly is configured to hold a dispenser.

In an aspect of the present disclosure, the dispenser is a cylindrical dispenser. The dispenser holding assembly circumferentially surrounds a bottom portion of the cylindrical dispenser.

In an aspect of the present disclosure, the first arm member or the second arm member define a curved profile.

In an aspect of the present disclosure, the dispenser holding assembly is pivotally coupled to the distal end of the second arm member.

In an aspect of the present disclosure, a hinge pivotally couples the first arm member to the second arm member.

In an aspect of the present disclosure, a locking mechanism prevents pivoting of the second arm member with respect to the first arm member. The locking mechanism releasably secures the first arm member and the second arm member to each other.

In an aspect of the present disclosure, the hand-grip defines a recess. The second arm member is configured to be at least partially received in the recess when the first arm member and the second arm member are in a folded configuration.

In an aspect of the present disclosure, the dispenser holding assembly defines a bottom surface configured to face a dispenser and a spherical side surface extending from the bottom surface. The spherical side surface and the bottom surface of the dispenser holding assembly define a spherical receiving sleeve. The spherical receiving sleeve is configured to receive a bottom portion of the dispenser.

In an aspect of the present disclosure, a plurality of raised panels extend from the spherical side surface. The raised panels are spaced apart from each other and securely and removably hold the dispenser in the spherical receiving sleeve of the dispenser holding assembly.

In an aspect of the present disclosure, at least one orifice is formed through the spherical side surface. The at least one orifice increases a flexibility of the spherical side surface.

In an aspect of the present disclosure, at least one pivot arm is at the distal end of the second arm member. A pivot extension extends from the dispenser holding assembly. The pivot extension is pivotally coupled to the pivot arm. The pivot extension allows pivoting of the dispenser holding assembly with respect to the second arm member.

In an aspect of the present disclosure, the first arm member and the second arm member are dimensioned and shaped to allow the dispenser to be pressed against a user's back by the user.

In an aspect of the present disclosure, a plurality of finger grip indents formed in a rear surface of the second arm member.

In an aspect of the present disclosure, a plurality of first finger grip indents are formed in the hand-grip and face in a first direction. A plurality of second finger grip indents are formed in the second arm member and face in a second direction opposite the first direction.

In an aspect of the present disclosure, a proximal end portion is defined by the hand-grip. An open proximal end is defined at the proximal end portion of the hand-grip. The open proximal end of the hand-grip is configured to receive the second arm member when the first and second arm members are in a folded configuration.

In an aspect of the present disclosure, a closed proximal end is defined at the proximal end portion of the hand-grip.

In an aspect of the present disclosure, a locking mechanism prevents pivoting of the second arm member with respect to the first arm member when the first and second arm members are in an unfolded configuration. The locking mechanism includes a first stop member configured to be releasably engaged with the first arm member and a second stop member configured to be releasably engaged with the second arm member.

In an aspect of the present disclosure, the pivot extension includes a plurality of stop members configured to prevent pivoting of the dispenser holding assembly with respect to the second arm member.

BRIEF DESCRIPTION OF THE DRAWINGS

Various aspects and features of the present disclosure are described hereinbelow with reference to the drawings wherein.

DETAILED DESCRIPTION

Figure 1:
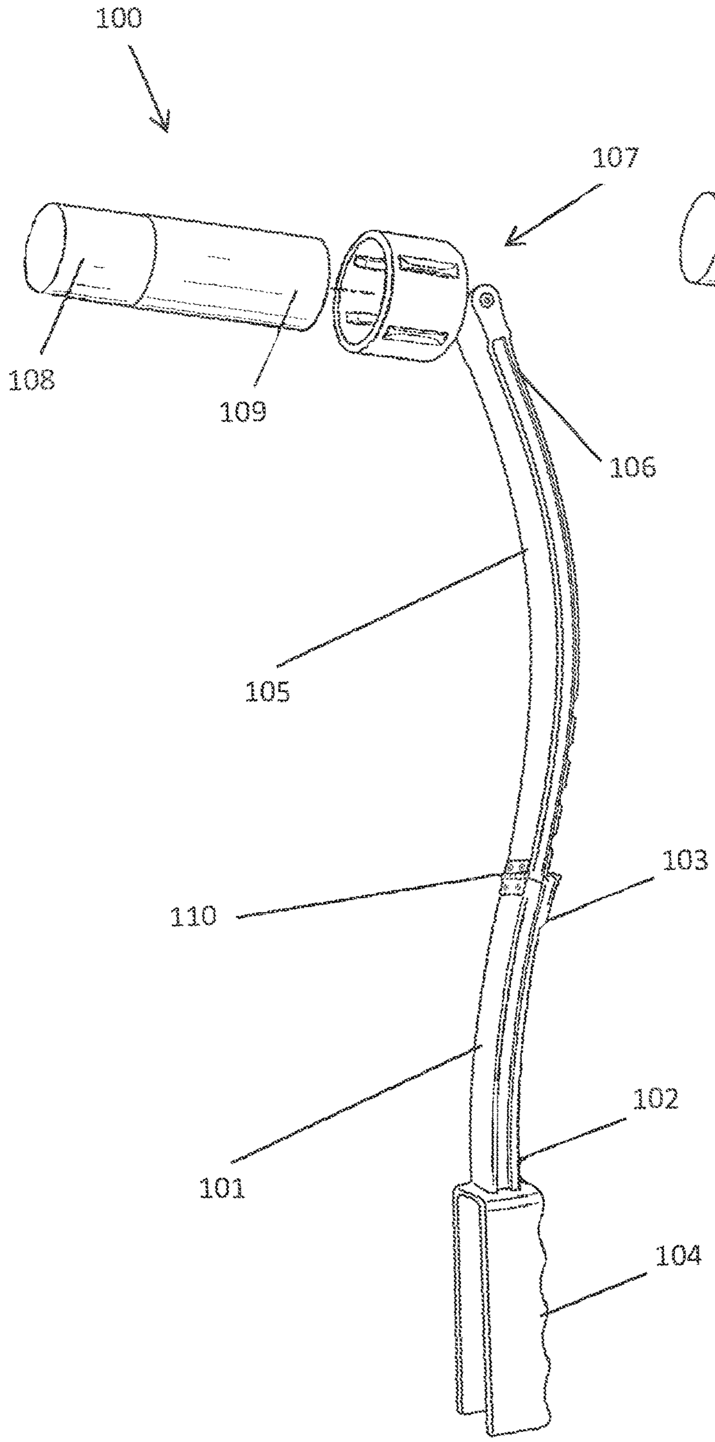
FIG. 1 is a side, perspective view of a handle assembly according to aspects of the present disclosure.
Figure 2:
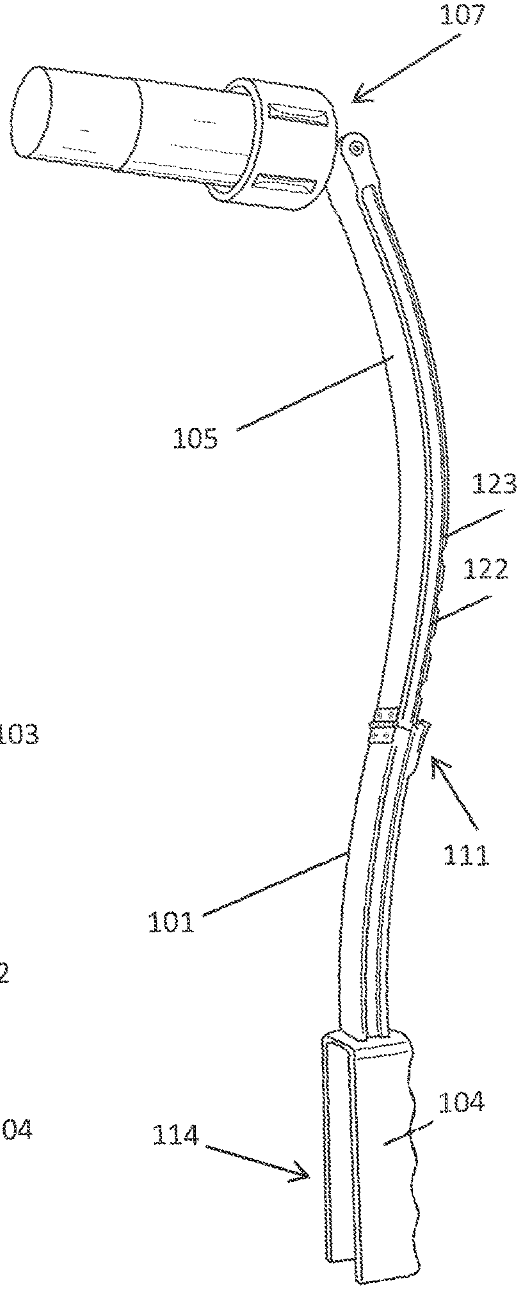
FIG. 2 is a side, perspective view of the handle assembly of FIG. 1 holding a pain relief gel dispenser.
Figure 3:
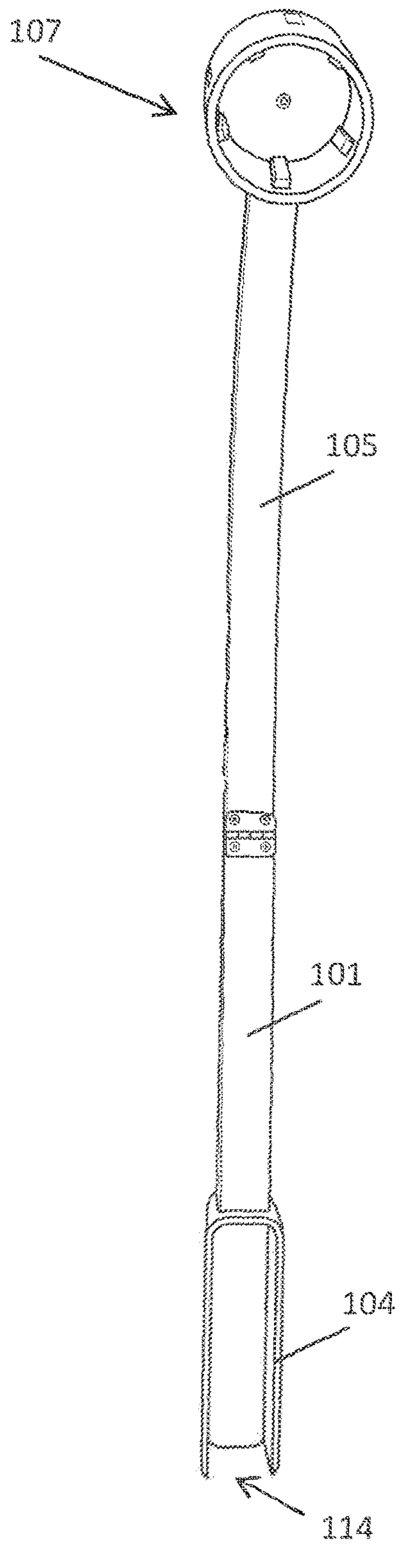
FIG. 3 is a front view of the handle assembly of FIG. 1.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Referring to FIGS. 1 to 10, a handle assembly 100 includes a first arm member 101. The first arm member 101 defines a proximal end 102 and a distal end 103. A hand-grip 104 is coupled to the proximal end 102 of the first arm member 101. A second arm member 105 is pivotally coupled (e.g., via a hinge 110) with the distal end 103 of the first arm member 101. The second arm member 105 defines a distal end 106. A dispenser holding assembly 107 is supported at the distal end 106 of the second arm member 105. The dispenser holding assembly 107 is configured to hold a dispenser 108. The dispenser 108 may be a medicinal dispenser such as a roll-on dispenser for a pain relief gel that can be applied to a user's back. Thus, the handle assembly 100 described herein can be employed for applying pain relief gel to a user's back without the assistance of a second person. Additionally, the handle assembly 100 described herein can be employed by a second person to apply a pain relief gel to a first person's back, while maintaining spacing between the first and second persons.

The dispenser 108 may be a cylindrical dispenser. The dispenser holding assembly 107 circumferentially surrounds a bottom portion 109 of the cylindrical dispenser 108. However, dispensers having other shapes can also be accommodated in the dispenser holding assembly 100 by modifying a shape thereof. For example, a bottom surface of a square or rectangular dispenser may be secured by the dispenser holding assembly 100.

In an aspect of the present disclosure, the first arm member 101 or the second arm member 105 define a curved profile (e.g., when viewed from a side view). For example, both the first arm member 101 and the second arm member 105 may be curved. The curves of the first arm member 101 and the second arm member 105 may be formed in different directions from each other. For example, the first arm member 101 may form a convex front surface, and the second arm member 105 forms a concave front surface.

Figure 4:
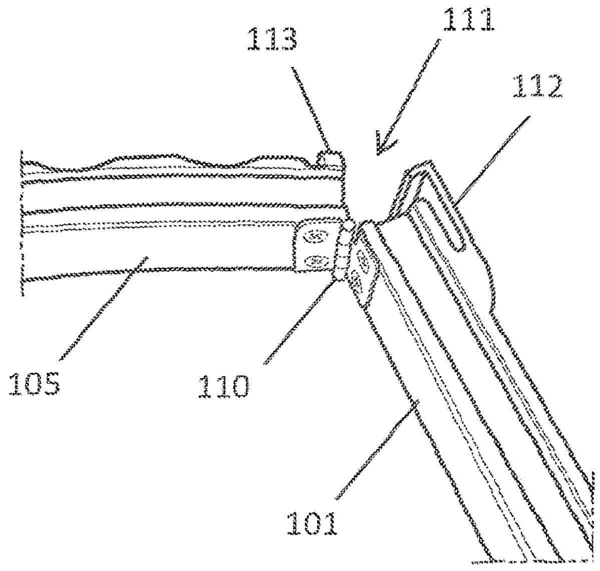
FIG. 4 is an enlarged, rear, perspective view of a folding mechanism of the handle assembly of FIG. 1.
Figure 5:
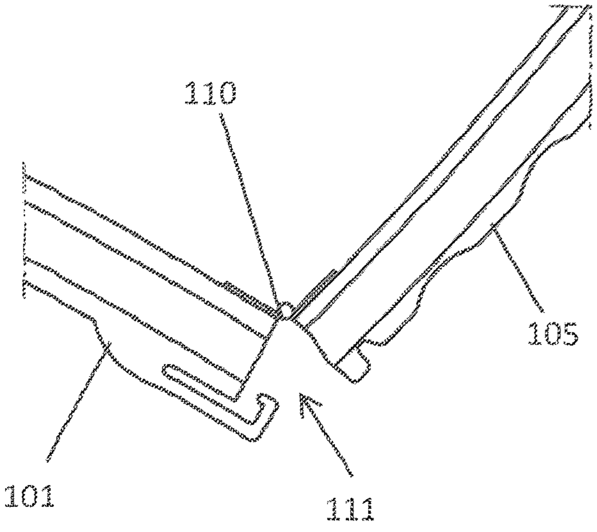
FIG. 5 is a side view of the folding mechanism of FIG. 4.

Referring particularly to FIGS. 4 and 5, a hinge 110 connects the first and second arm members 101 and 105 and allows pivoting of the arm members. The hinge 110 allows folding of the first and second arm members 101 and 105 against each other and between folded/unfolded configurations. A locking mechanism 111 prevents pivoting of the second arm member 105 with respect to the first arm member 101. The locking mechanism 111 releasably secures the first arm member 101 and the second arm member 105 to each other when the first and second arm members 101 and 105 are in an unfolded configuration. The locking mechanism 111 may be formed on surfaces of the first and second arm members 101 and 105 opposite the hinge 110. Thus, the hinge 110 and locking mechanism 111 may operate in a cooperative fashion to facilitate folding and unfolding of the first and second arm members 101 and 105 from each other. The locking mechanism 111 may include a locking arm 112 and a raised tab 113 forming an indent 133 configured to receive the locking arm 112.

Figure 6:
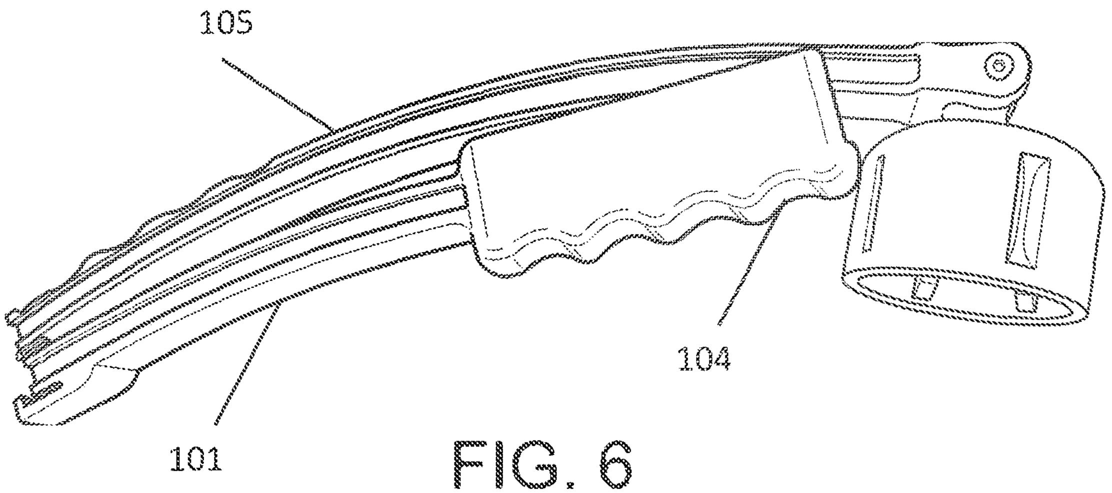
FIG. 6 is a side view of the handle assembly of FIG. 1 in a folded configuration.
Figure 7:
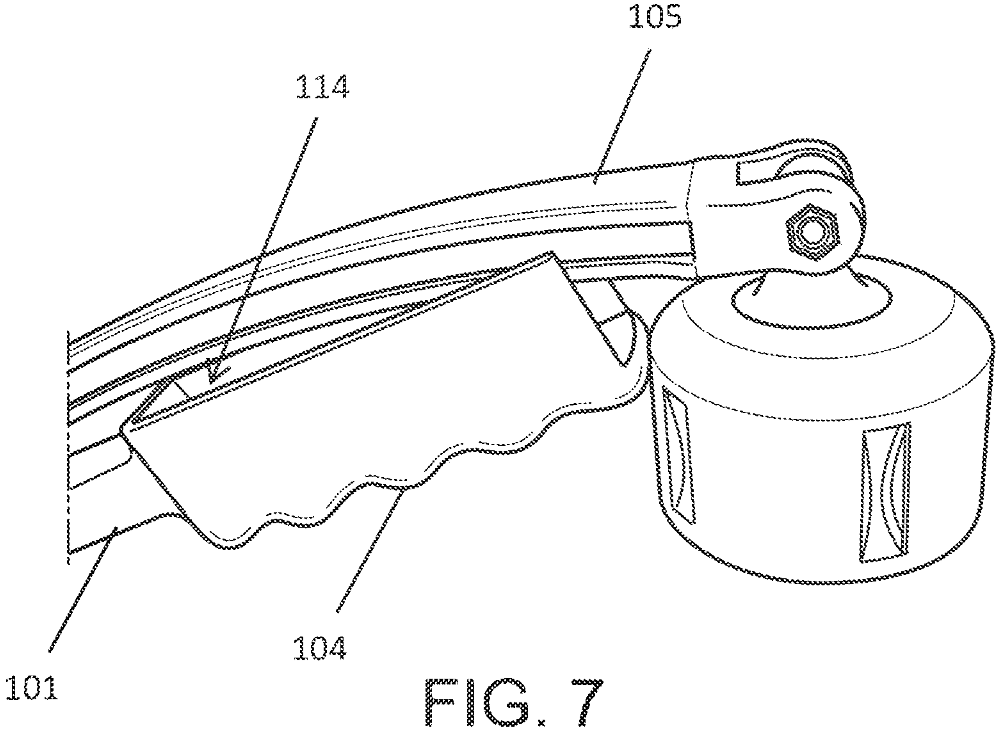
FIG. 7 is an enlarged, side, perspective view of the handle assembly of FIG. 6 in the folded configuration.

Referring particularly to FIGS. 6 and 7, the hand-grip 104 defines a recess 114. The second arm member 105 is configured to be at least partially received in the recess 114 when the first arm member 101 and the second arm member 105 are in a folded configuration.

Figure 9:
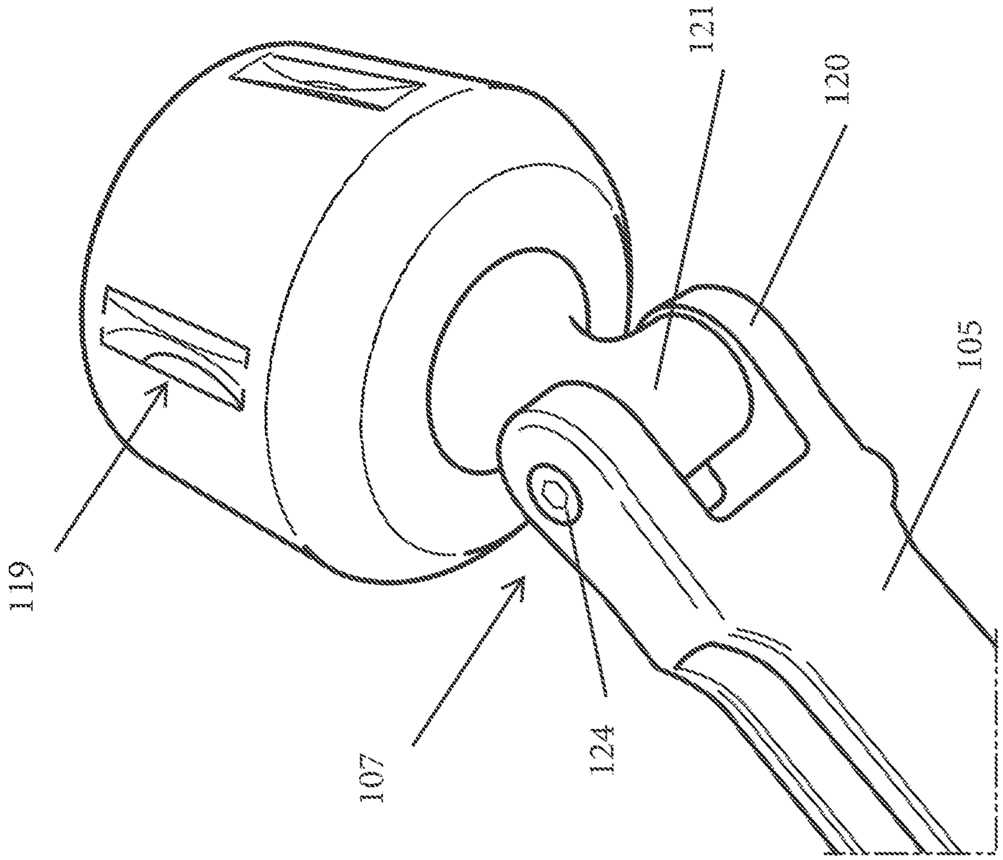
FIG. 9 is a rear, perspective view of the dispenser holding assembly of FIG. 8.
Figure 8:
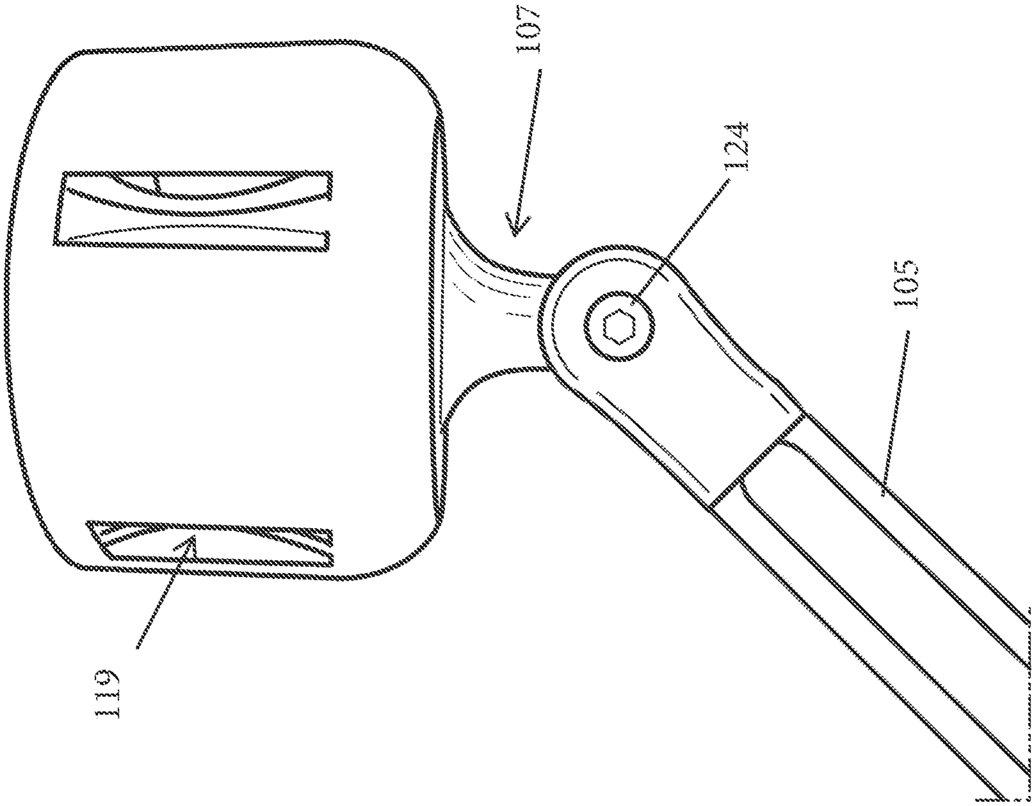
FIG. 8 is an enlarged, side view of a dispenser holding assembly of the handle assembly of FIG. 1.
Figure 10:
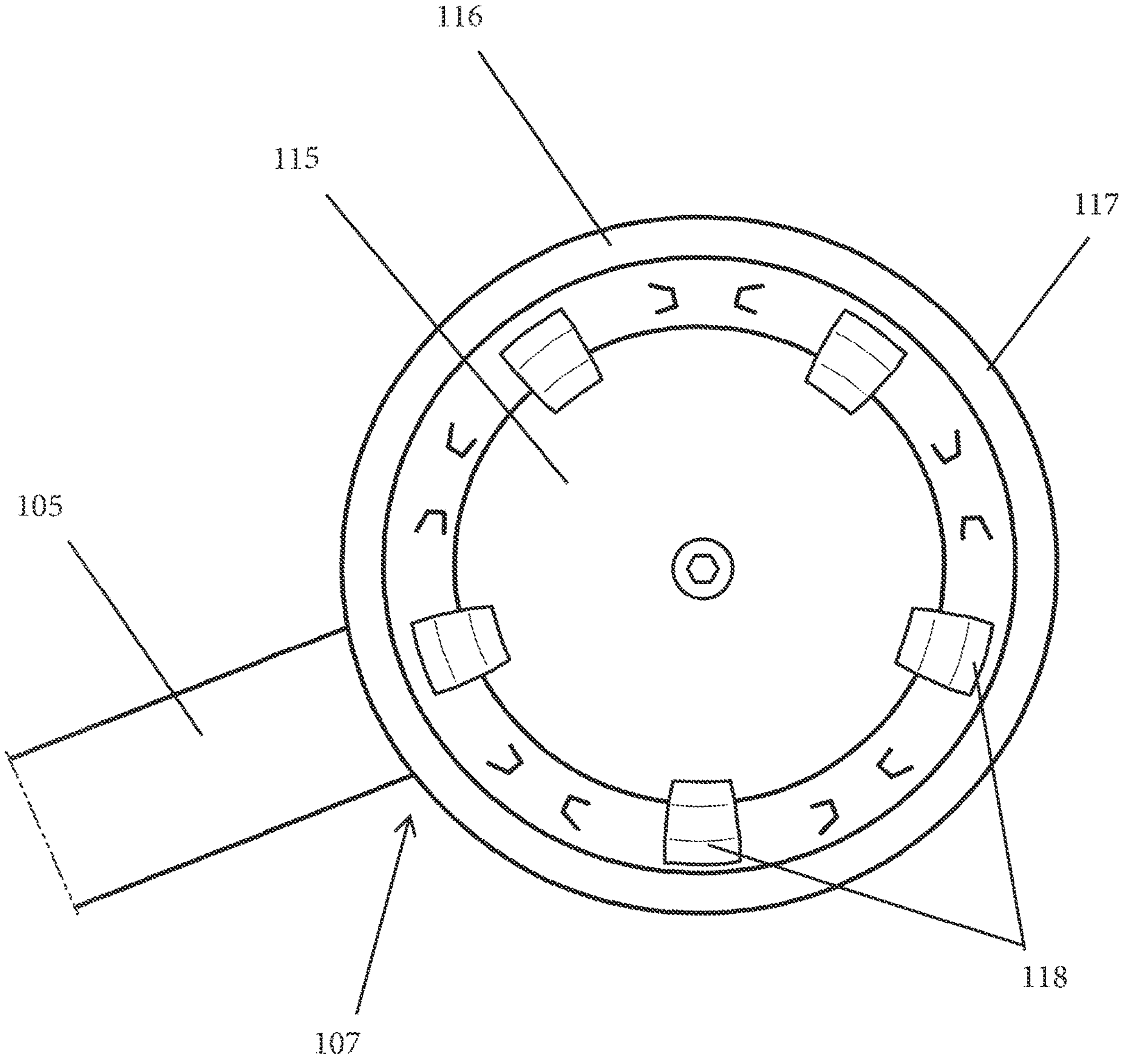
FIG. 10 is an enlarged, front view of the dispenser holding assembly of FIG. 8.

Referring particularly to FIGS. 8 to 10, the dispenser holding assembly 107 defines a bottom surface 115 configured to face the dispenser 108 and a spherical side surface 116 extending from the bottom surface 115. The spherical side surface 116 and the bottom surface 115 of the dispenser holding assembly 107 define a spherical receiving sleeve 117. The spherical receiving sleeve 117 is configured to receive a bottom portion of the dispenser 108. Thus, a majority of the dispenser 108 can be gripped by a user after use for removing it from the dispenser holding assembly 107.

The dispenser holding assembly 107 allows for a secure grip of the dispense 108 during use to facilitate application of a product held in the dispenser 108 to a user's body (e.g., to a user's back). For example, the bottom surface 115 of the dispenser holding assembly 107 can contact the bottom surface 108 of the dispenser 108 to apply pressure thereto for application of contents of the dispenser to the user's body.

In an aspect of the present disclosure, a plurality of raised panels 118 extend from the spherical side surface 116. The raised panels 118 are spaced apart from each other and securely and removably hold the dispenser 108 in the spherical receiving sleeve 117 of the dispenser holding assembly 107 by applying pressure to side surfaces of the dispenser 108. The raised panels 118 may be formed of or may include a rubber material.

In an aspect of the present disclosure, at least one orifice 119 is formed through the spherical side surface 116. The at least one orifice 119 increases a flexibility of the spherical side surface 116, thus allowing dispensers of different sizes or shapes to be secured by the dispenser holding assembly 107.

In an aspect of the present disclosure, at least one pivot arm 120 is at the distal end of the second arm member 105. A pivot extension 121 extends from the dispenser holding assembly 107. The pivot extension 121 is pivotally coupled to the pivot arm 120. The pivot extension 121 allows pivoting of the dispenser holding assembly 107 with respect to the second arm member 105. The pivot extension 121 may be secured between first and second pivot arms 101 and 105 extending from the distal end of the second arm member 105. The pivot extension 121 and/or the first and second pivot arms 101 and 105 may include a plurality of protrusions and indents forming a ratchet mechanism that holds the dispenser holding assembly in one of a number of rotational orientations. A screw 124 may extend between the first and second pivot arms 101 and 105. The screw 124 extends through the pivot extension 121 to secure the pivot extension 121 to the first and second pivot arms 101 and 105. The screw 124 also provides tension to the ratchet mechanism.

In an aspect of the present disclosure, a plurality of finger grip indents 122 are formed in a rear surface 123 of the second arm member 105. The plurality of finger grip indents 122 allow use of the handle assembly 100 when the first and second arm members 101 and 105 are in a folded configuration.

In an aspect of the present disclosure, a single telescoping arm member may be employed. Alternatively, the first and/or second arm members 101 and 105 may be configured to telescope to vary a length thereof.

Figure 11:
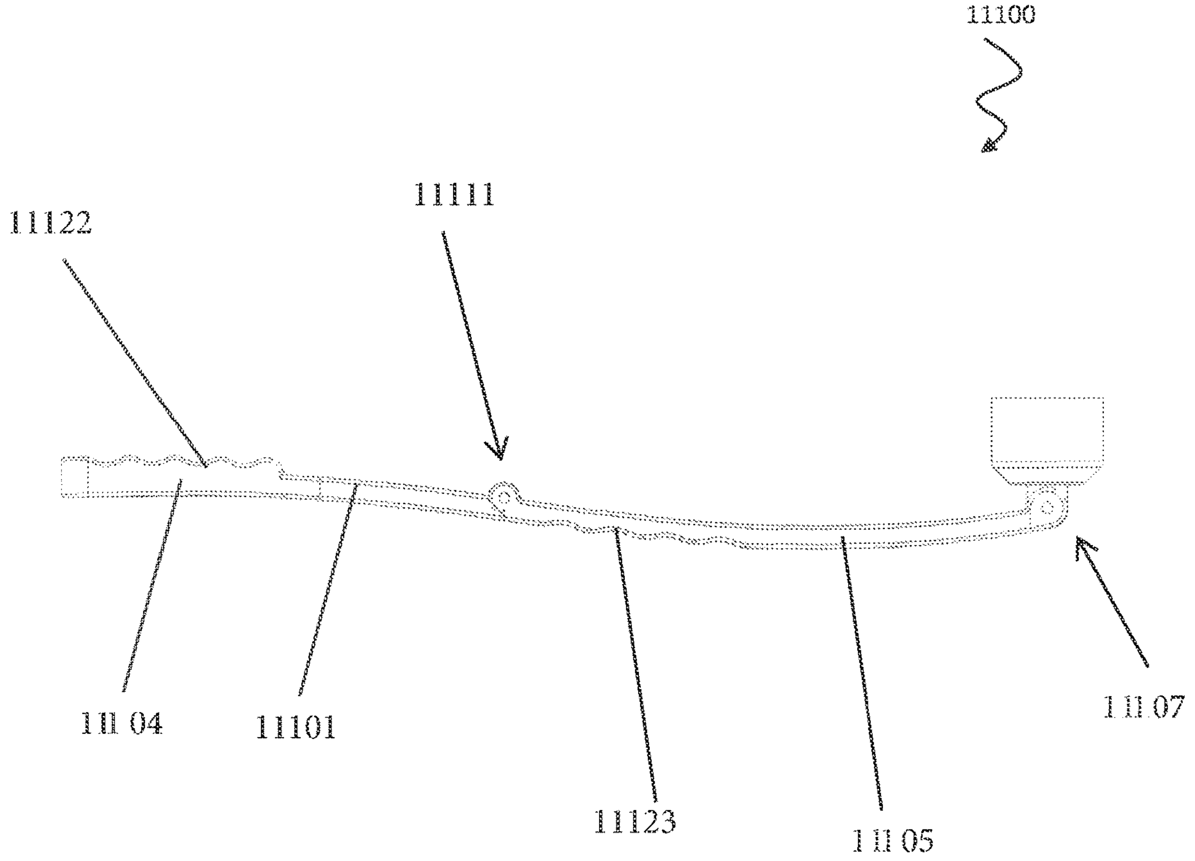
FIG. 11 is a side view of a handle assembly in an unfolded configuration according to aspects of the present disclosure.
Figure 12:
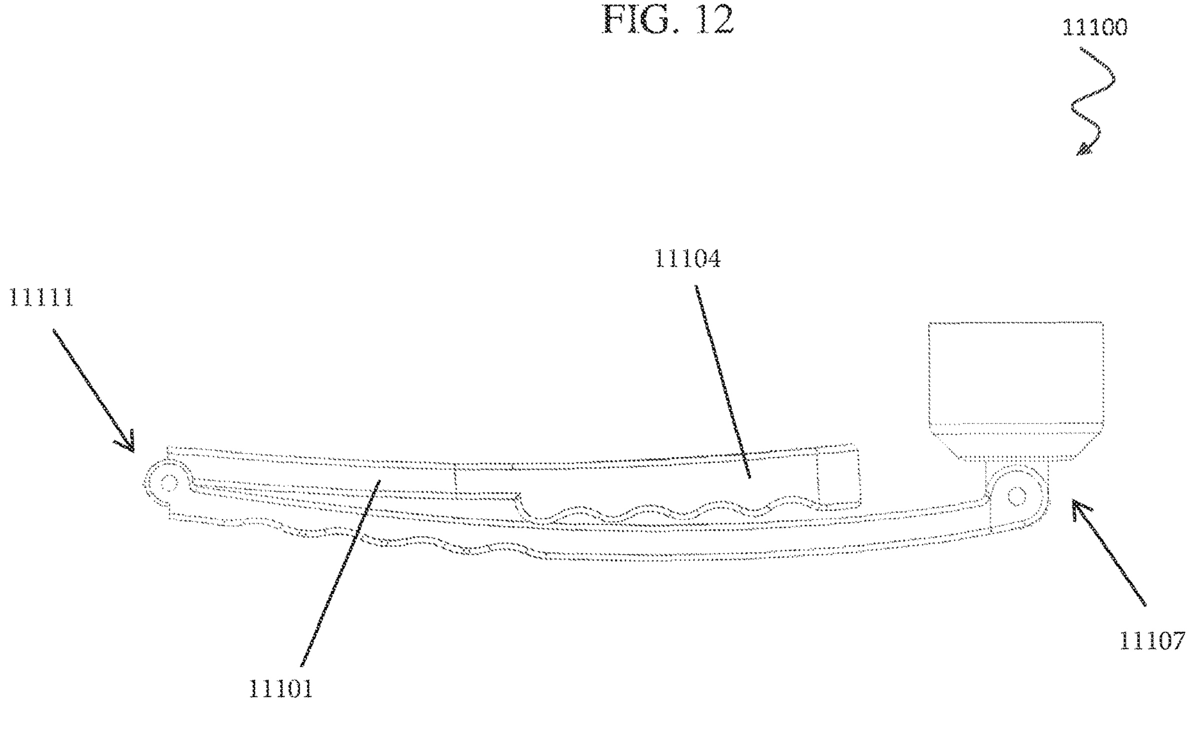
FIG. 12 is a side view of the handle assembly of FIG. 11 in a folded configuration.
Figure 13:
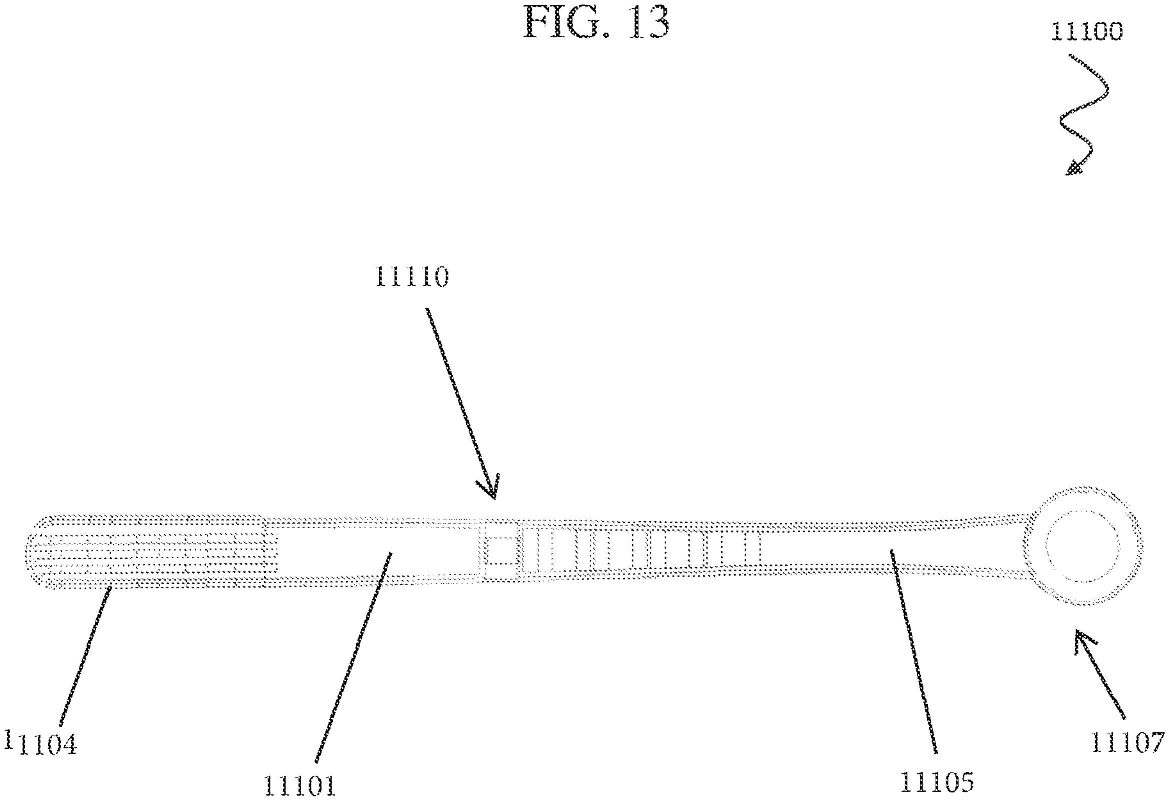
FIG. 13 is a top plan view of the handle assembly of FIG. 11 in an unfolded configuration.
Figure 14:
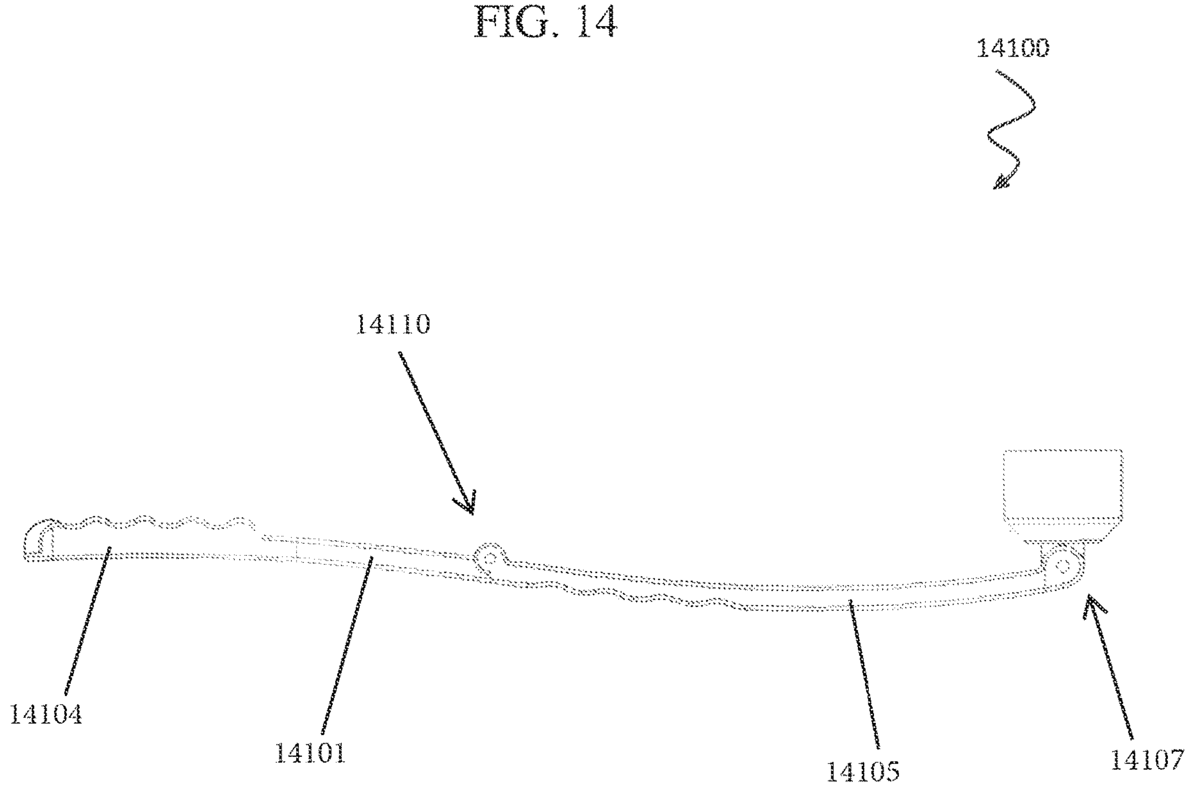
FIG. 14 is a side view of a handle assembly in an unfolded configuration according to aspects of the present disclosure.
Figure 15:
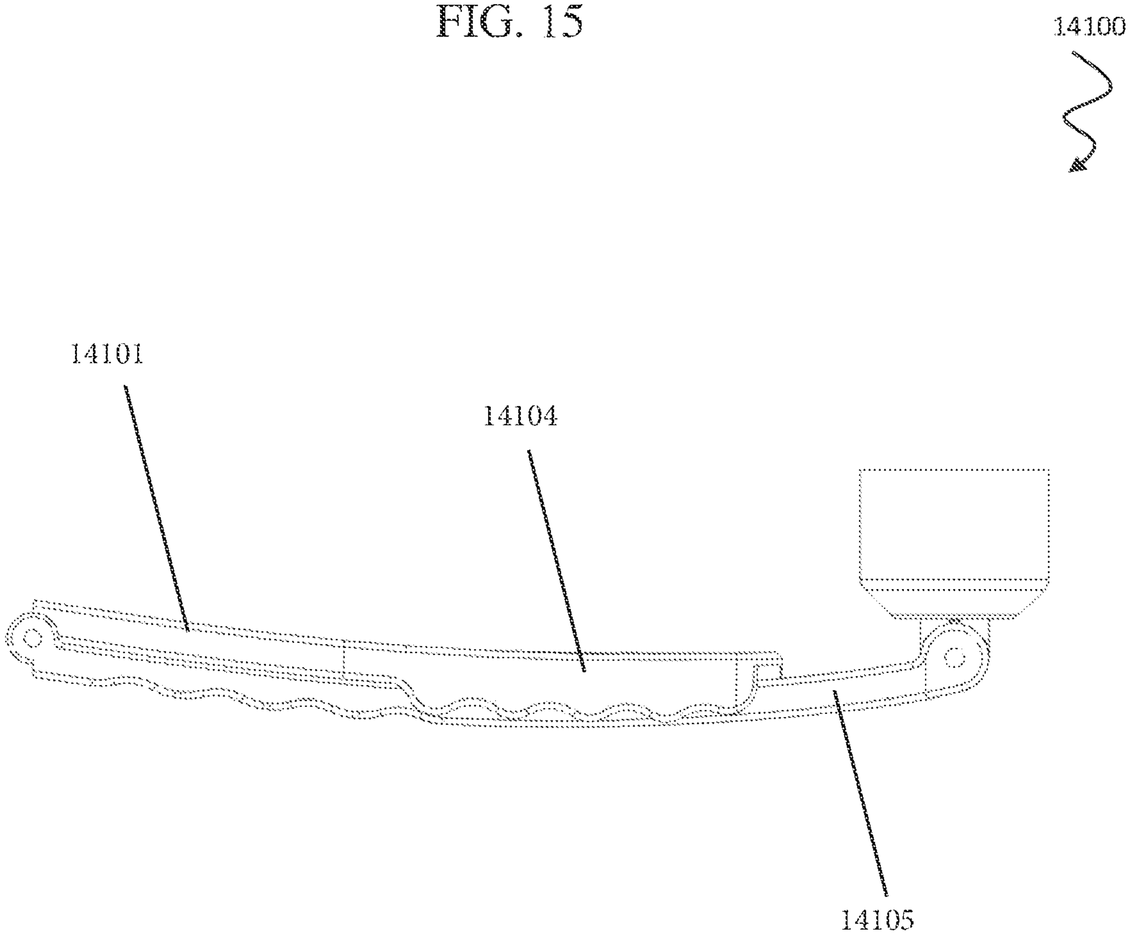
FIG. 15 is a side view of the handle assembly of FIG. 14 in a folded configuration.
Figure 16:
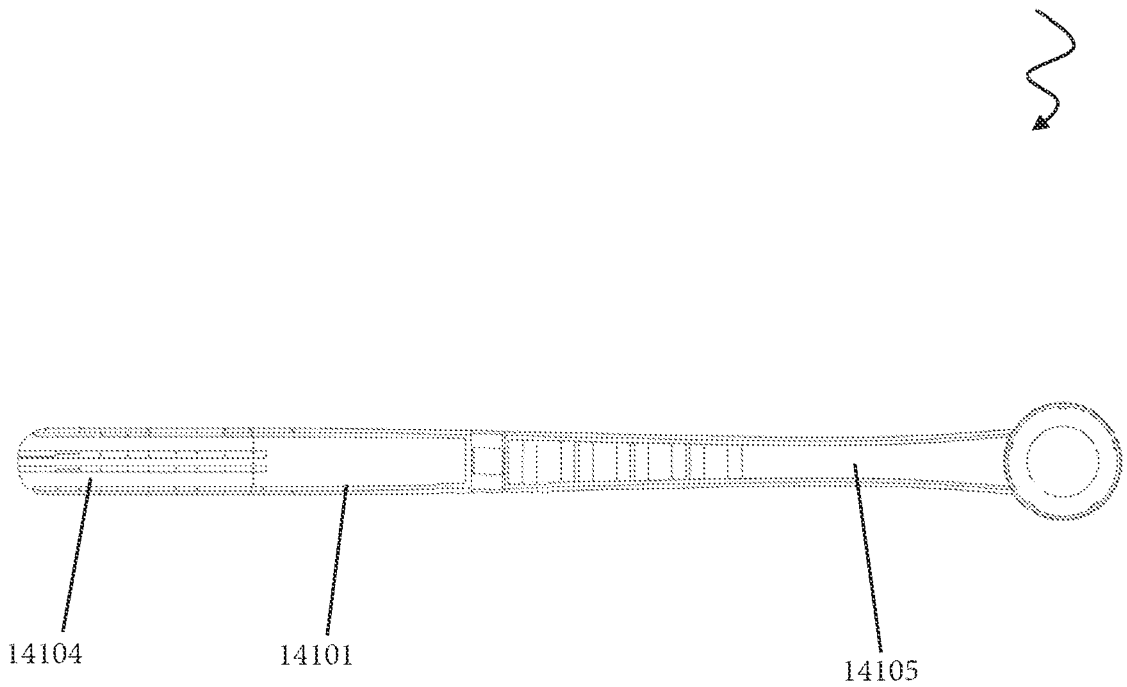
FIG. 16 is a top plan view of the handle assembly of FIG. 14 in an unfolded configuration.
Figure 17:
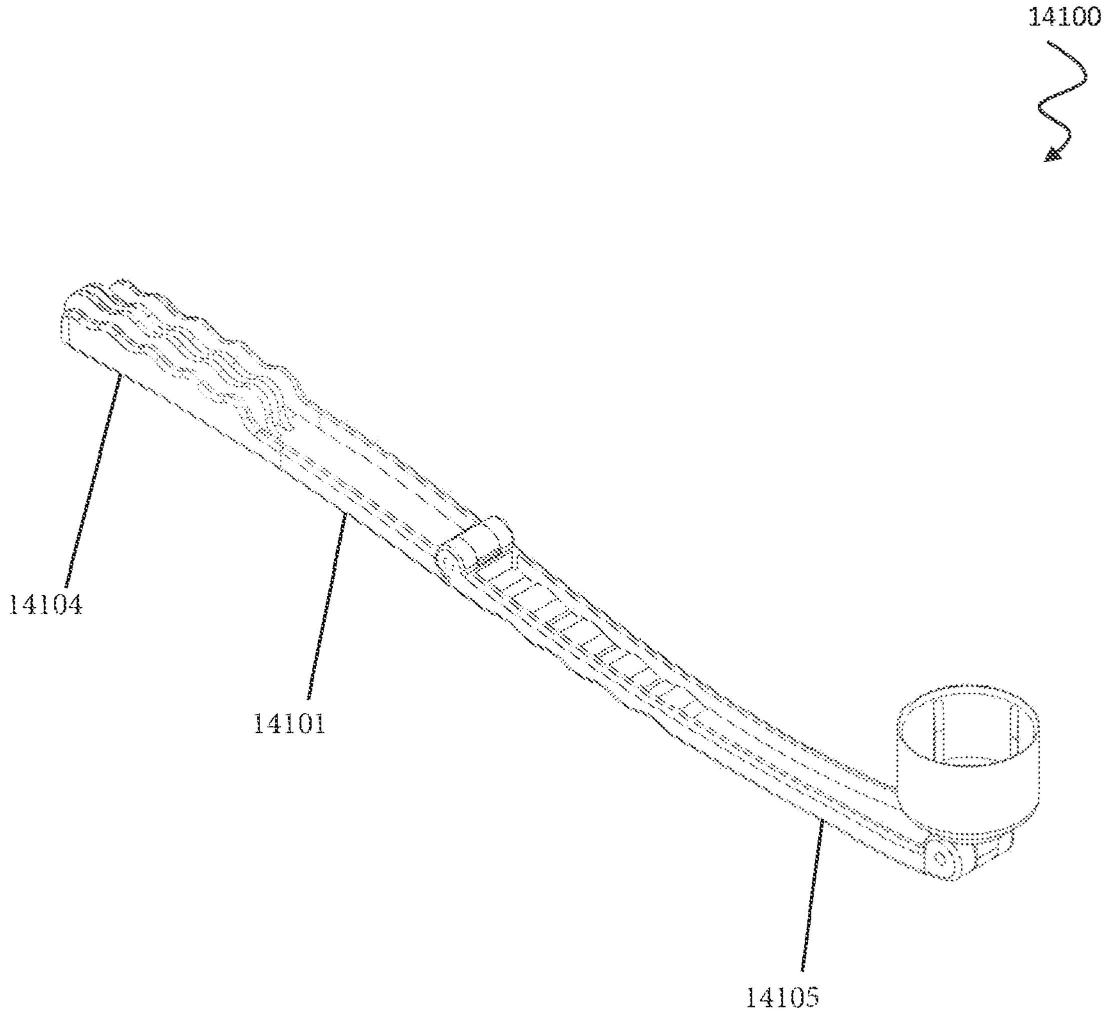
FIG. 17 is a perspective view of the handle assembly of FIG. 14 in an unfolded configuration.

Unless otherwise indicated below, the handle assembly described below with reference to FIGS. 11-13 is substantially the same as the other handle assemblies described herein, and thus duplicative descriptions may be omitted below.

Referring particularly to FIGS. 11-13, a handle assembly 11100 includes a first arm member 11101 pivotably coupled with second arm member 11105. A hand-grip 11104 is arranged at a first side of the handle assembly 11100 and a dispenser holding assembly 11107 is arranged at a second side of the handle assembly 11100 opposite the first side.

A plurality of first finger grip indents 11122 are formed in the hand-grip 11104 and face in a first direction. A plurality of second finger grip indents 11123 are formed in the second arm member 11105 and face in a second direction opposite the first direction.

Figure 22:
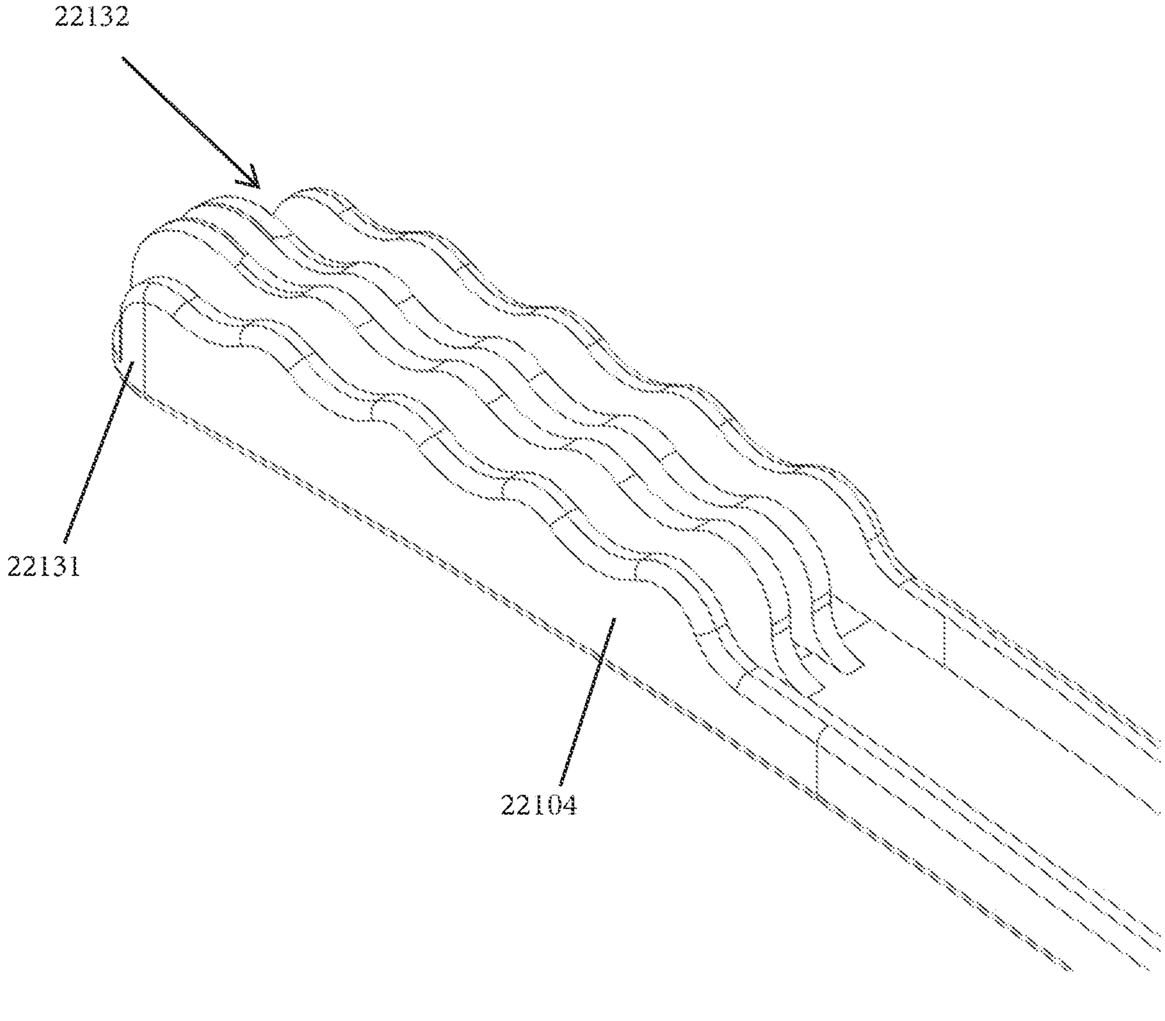
FIG. 22 is an enlarged perspective view of a hand-grip having an open proximal end according to aspects of the present disclosure.

Referring particularly to FIGS. 11-13 and 21, a closed proximal end 21132 is defined at the proximal end portion 21131 of the hand-grip 21104. The hand grip 21104 may include a plurality of raised walls 21133 with gaps therebetween. The raised walls 21133 are configured to provide structural rigidity to hand grip 21104 and to create a relatively lighter hand grip 21104 than a hand grip employing a solid block of material. The hand grip 22104 described below with reference to FIG. 22 may include similar raised sidewalls.

When in a folded configuration (see, e.g., FIG. 12), the raised walls 21133 contact the second arm member 11105.

Unless otherwise indicated below, the handle assembly described below with reference to FIGS. 14-17 is substantially the same as the other handle assemblies described herein, and thus duplicative descriptions may be omitted below.

Referring particularly to FIGS. 14-17, a handle assembly 14100 includes a first arm member 14101 pivotably coupled with second arm member 14105. A hand-grip 14104 is arranged at a first side of the handle assembly 14100 and a dispenser holding assembly 14107 is arranged at a second side of the handle assembly 11100 opposite the first side.

Referring particularly to FIGS. 14-17 and 22, a proximal end portion 22131 is defined by the hand-grip 22104. An open proximal end 22132 is defined at the proximal end portion 22131 of the hand-grip 22104. The open proximal end 22132 of the hand-grip 22104 is configured to receive the second arm member 14105 therein when the first and second arm members 14101 and 14105 are in a folded configuration (see, e.g., FIG. 15).

Figure 18:
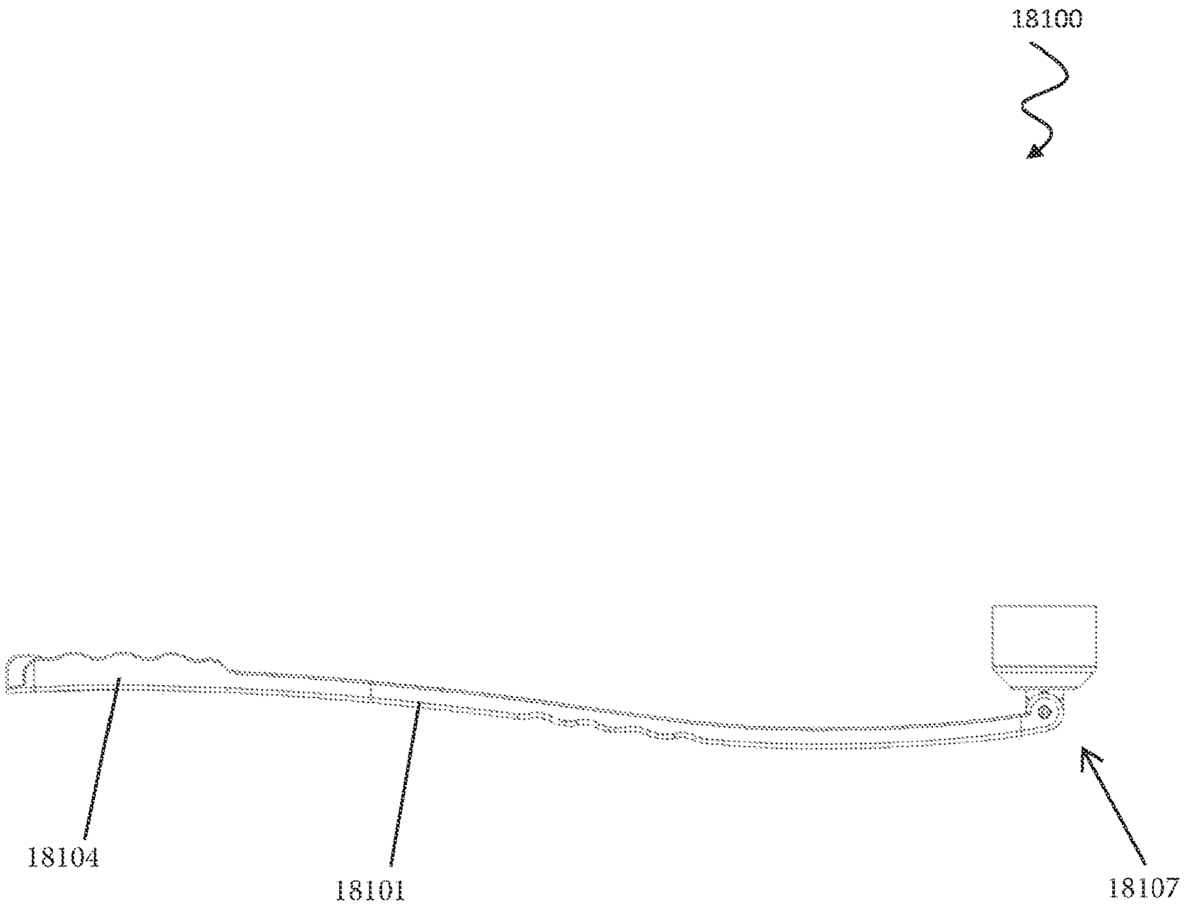
FIG. 18 is a side view of a handle assembly including a single fixed handle according to aspects of the present disclosure.
Figure 19:
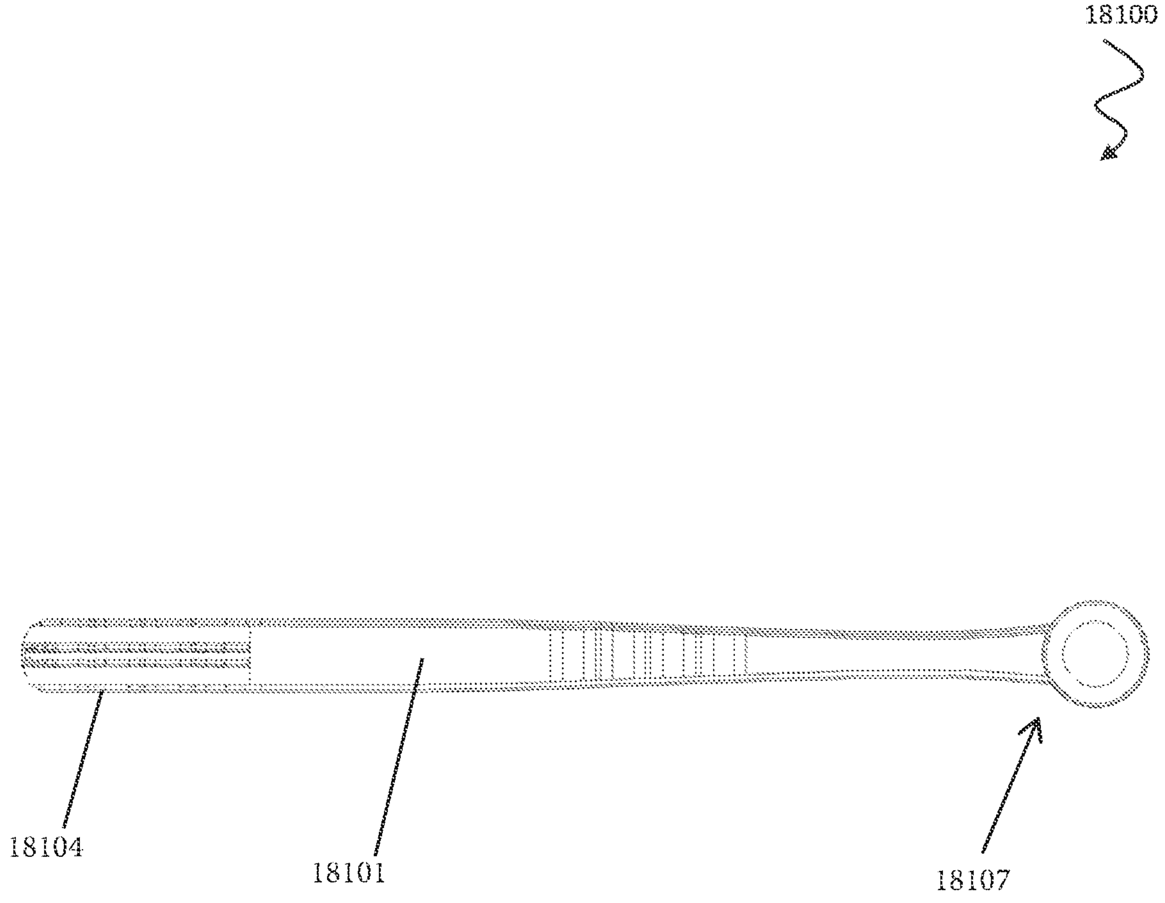
FIG. 19 is a top plan view of the handle assembly of FIG. 18.
Figure 20:
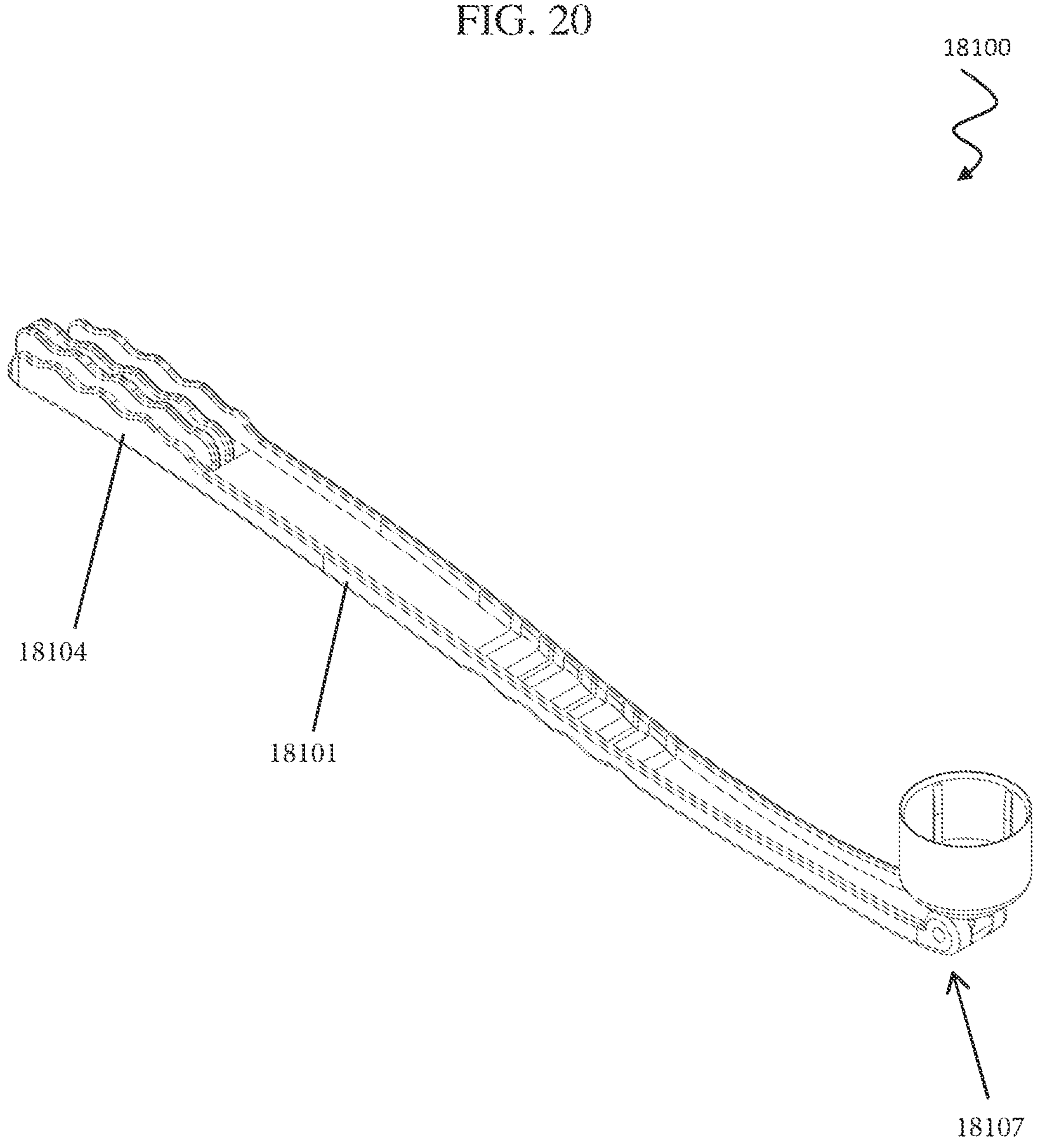
FIG. 20 is a perspective view of the handle assembly of FIG. 18.
Figure 21:
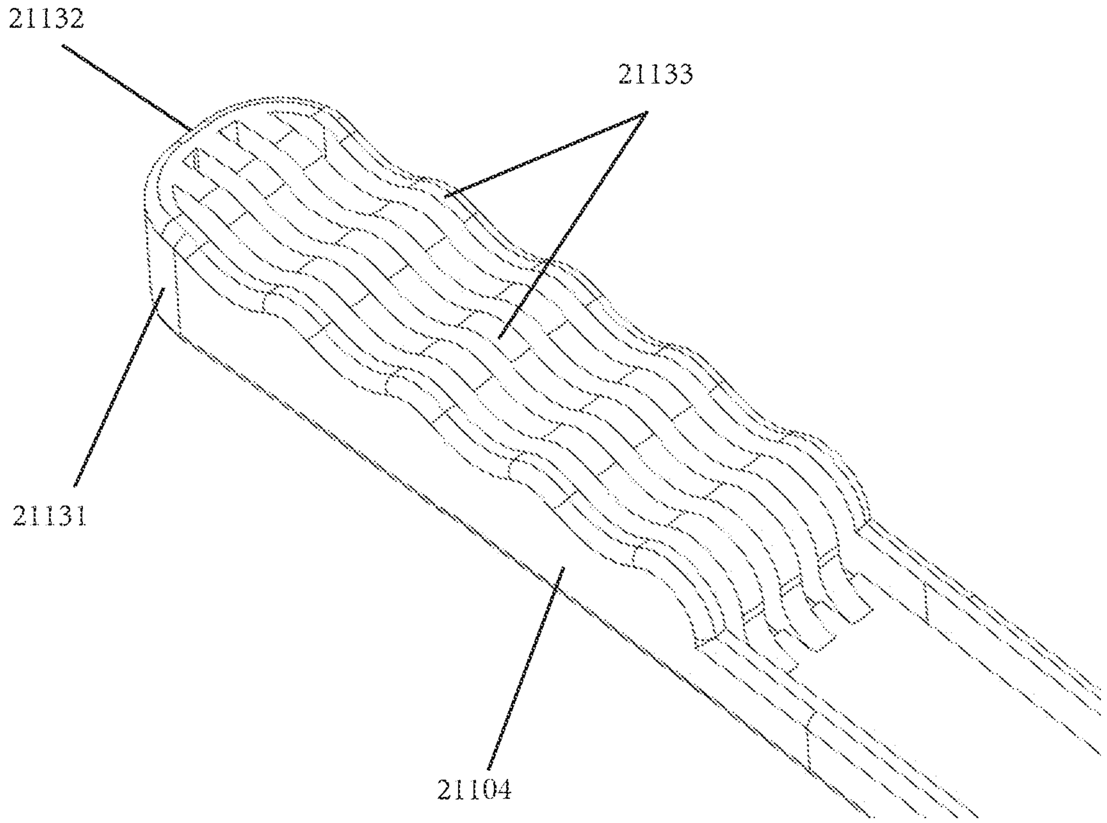
FIG. 21 is an enlarged perspective view of a hand-grip having a closed proximal end according to aspects of the present disclosure.

Unless otherwise indicated below, the handle assembly described below with reference to FIGS. 18-20 is substantially the same as the other handle assemblies described herein, and thus duplicative descriptions may be omitted below.

Referring particularly to FIGS. 18-20, a handle assembly 18100 includes a single fixed handle 18101. A hand-grip 18104 is arranged at a first side of handle assembly 18100 and a dispense holding assembly 18107 is arranged at a second side of the handle assembly 18100 opposite the first side.

Figure 23:
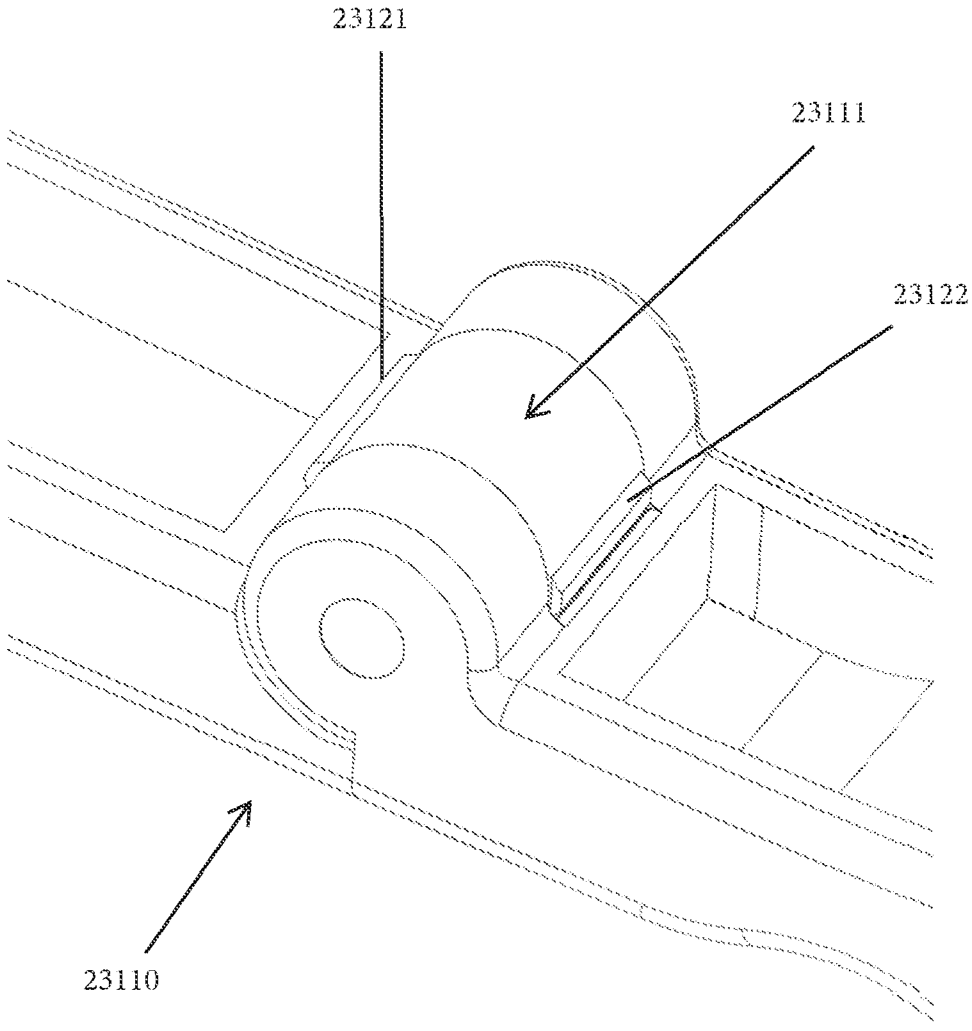
FIG. 23 is an enlarged, perspective view of a hinge assembly according to aspects of the present disclosure.

Referring to FIG. 23, a hinge assembly 23110 connecting the first and second arms described herein may include a locking mechanism 23111 configured to releasably hold the first and second arms in an unfolded configuration.

The locking mechanism 23111 includes a first stop member 23121 configured to be releasably engaged with the first arm member and a second stop member 23122 configured to be releasably engaged with the second arm member. Each stop member 23121, 23122 may be releasably engaged with a corresponding orifice in the first or second arm members.

Figure 24:
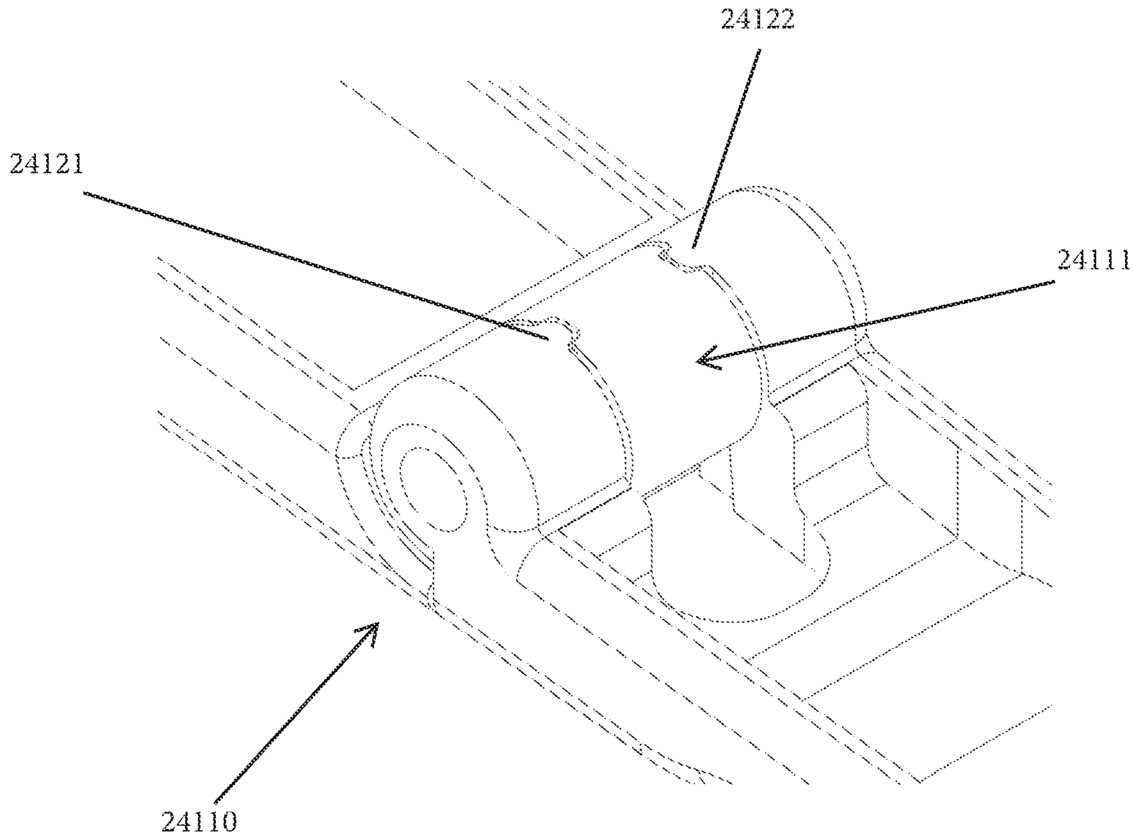
FIG. 24 is an enlarged, perspective view of another hinge assembly according to aspects of the present disclosure.
Figure 25:
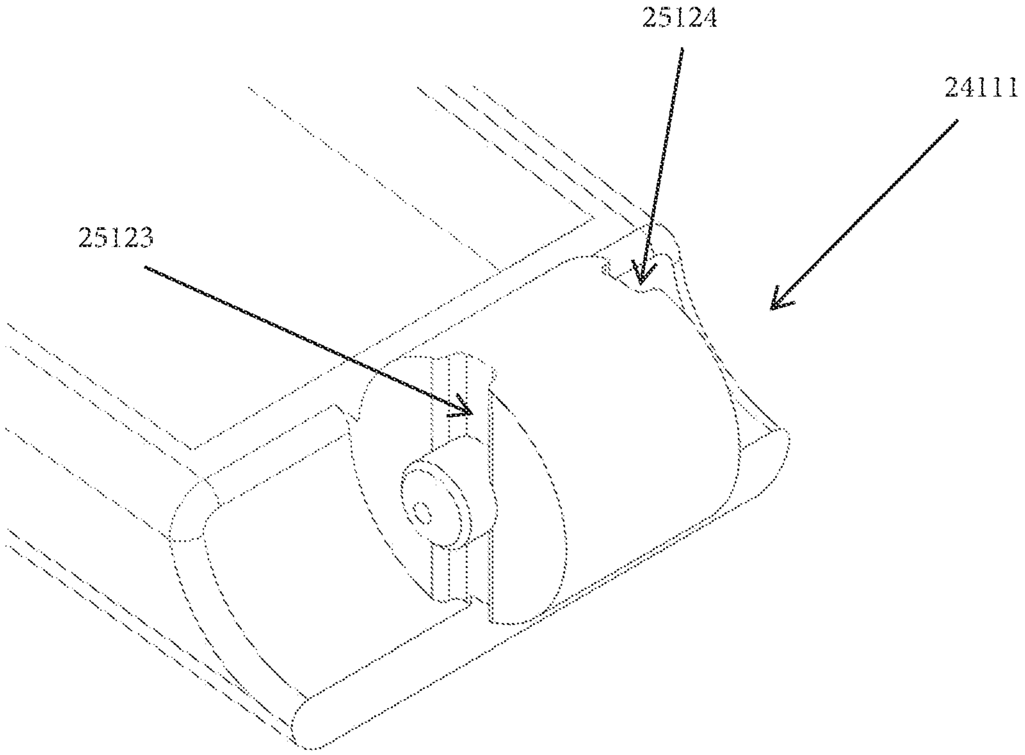
FIG. 25 is an enlarged, perspective view of indents of the hinge assembly of FIG. 24.
Figure 26:
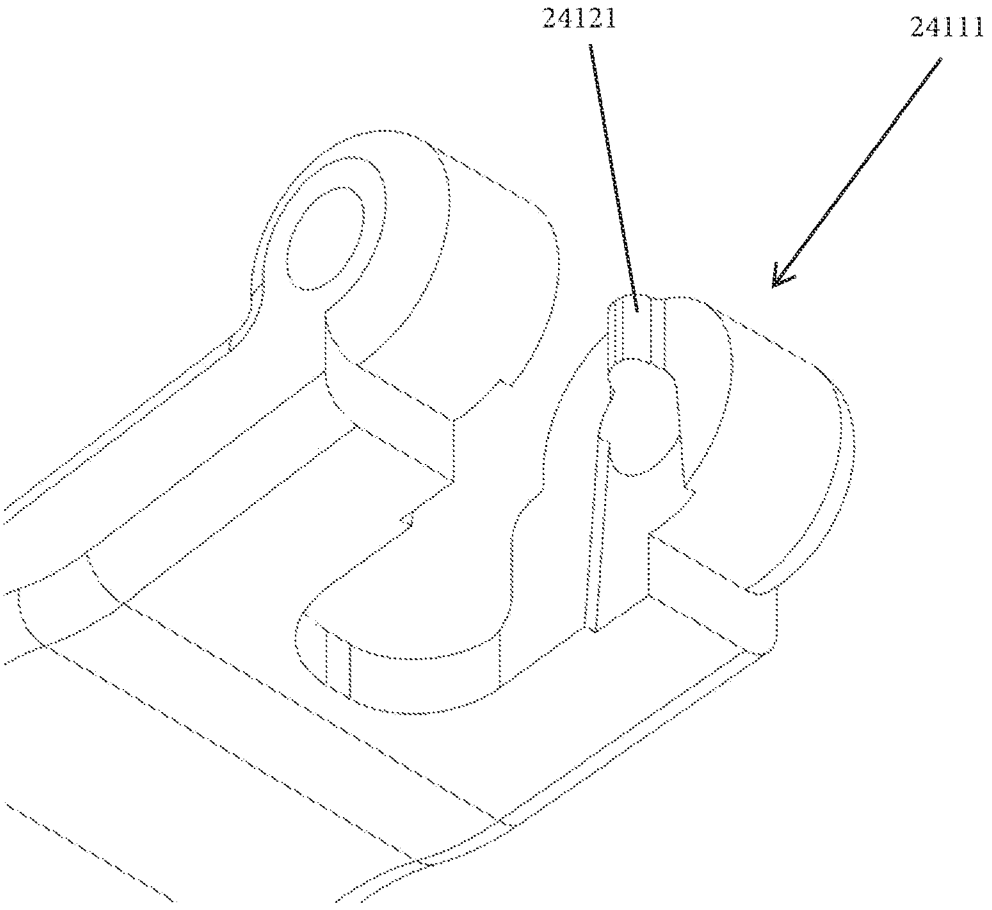
FIG. 26 is an enlarged, perspective view of a stop member of the hinge assembly of FIG. 24.

Referring to FIGS. 24-26, a hinge assembly 24110 connecting the first and second arms described herein may include a locking mechanism 24111 configured to releasably hold the first and second arms in an unfolded configuration. The locking mechanism 24111 includes first and second stop members 24121, 24122 configured to be removably received in a corresponding orifice 25123, 25124, respectively.

Each locking mechanism described herein may define a protrusion configured to be received in a corresponding orifice.

Figure 27:
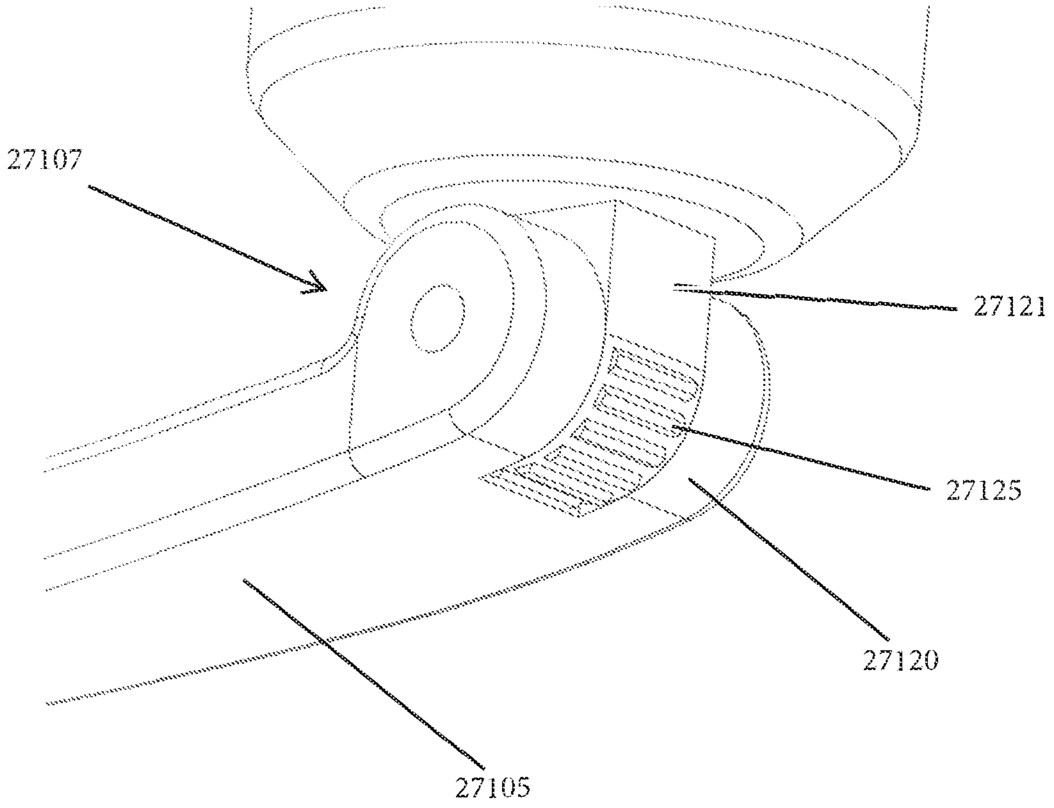
FIG. 27 is an enlarged, perspective view of a dispenser holding assembly according to aspects of the present disclosure.
Figure 28:
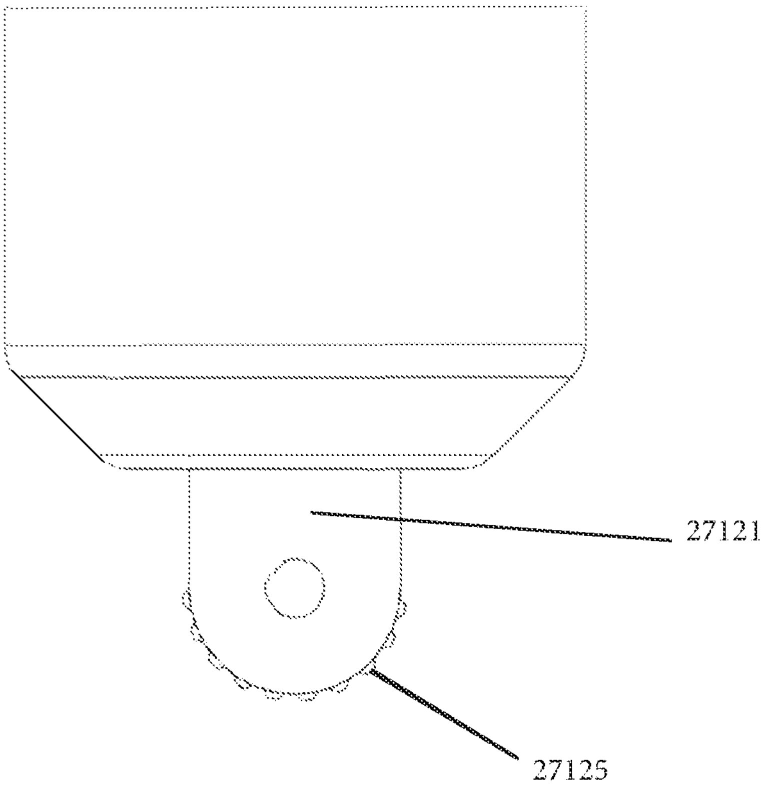
FIG. 28 is an enlarged, side view of the pivot extension of the dispenser holding assembly of FIG. 27.

Referring to FIGS. 27-28, dispenser holding assembly 27107 includes a pivot extension 27121 pivotably supported by pivot arms 27120 of second arm member 27105. The pivot extension 27121 includes a plurality of stop members 27125 configured to prevent pivoting of the dispenser holding assembly 27107 with respect to the second arm member 27105 to hold the dispenser holding assembly 27107 at a plurality of angles with respect to the second arm member 27105.

Figure 29:
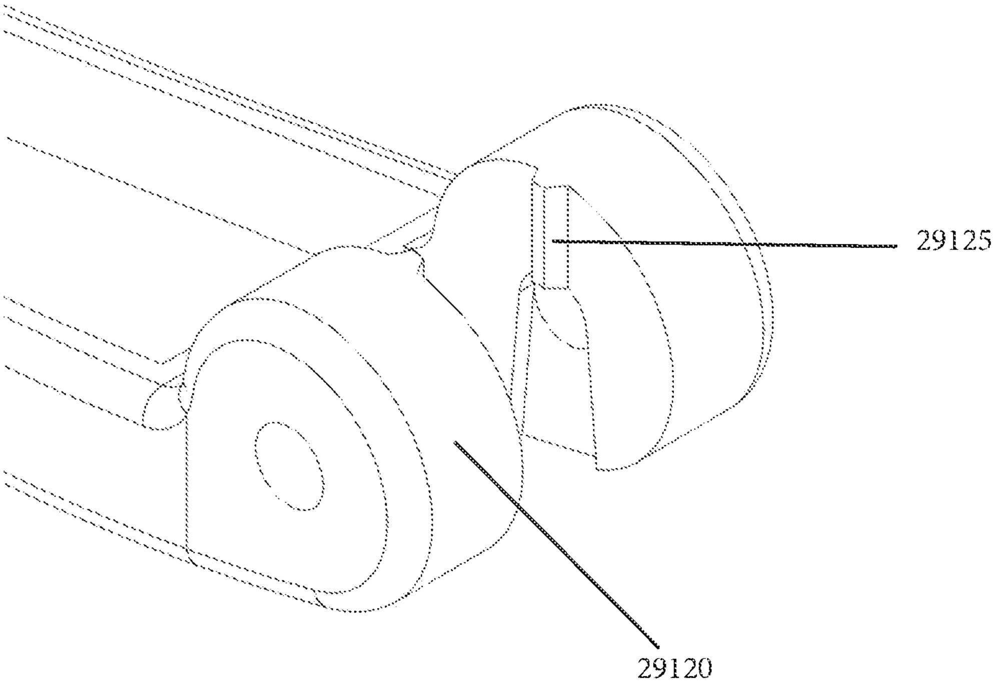
FIG. 29 is an enlarged, perspective view of a pivot arm of another dispenser holding assembly according to aspects of the present disclosure.
Figure 30:
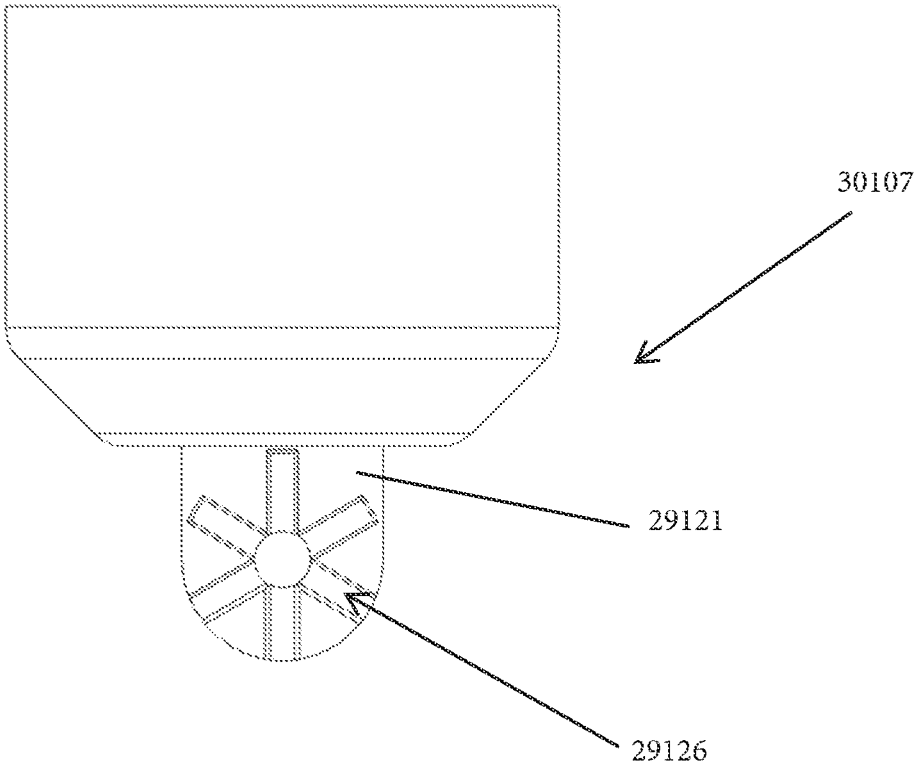
FIG. 30 is an enlarged, side view of the pivot extension of the dispenser holding assembly of FIG. 29.

Referring to FIGS. 29-30, pivoting of a dispenser holding assembly 30107 may be controlled by stop members 29125 extending from pivot arms 29120 that are received in orifices 29126 formed in pivot extension 29121.

The handle assembly described herein, and any components thereof, may be formed of a plastic material.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A handle assembly, comprising:

a first arm member defining a proximal end and a distal end;

a hand-grip defined at the proximal end of the first arm member;

a second arm member pivotally coupled with the distal end of the first arm member, the second arm member defining a distal end;

a plurality of finger grip indents formed in a rear surface of the second arm member; and a dispenser holding assembly pivotably coupled with the distal end of the second arm member, wherein the dispenser holding assembly defines a bottom surface thereof, wherein the dispenser holding assembly is configured to hold a dispenser, wherein the dispenser holding assembly is configured to at least partially circumferentially surround a bottom portion of the dispenser, and wherein the bottom surface of the dispenser holding assembly is configured to conceal the bottom portion of the dispenser.

2. The handle assembly of claim 1, wherein the dispenser is a cylindrical dispenser.

3. The handle assembly of claim 2, wherein the dispenser holding assembly is configured to completely circumferentially surround the bottom portion of the cylindrical dispenser.

4. The handle assembly of claim 1, wherein the first arm member or the second arm member define a curved profile.

5. The handle assembly of claim 1, further including a hinge pivotally coupling the first arm member to the second arm member.

6. The handle assembly of claim 1, further including a locking mechanism configured to prevent pivoting of the second arm member with respect to the first arm member.

7. The handle assembly of claim 1, wherein the hand-grip defines a recess therein, the second arm member configured to be at least partially received in the recess when the first arm member and the second arm member are in a folded configuration.

8. The handle assembly of claim 1, wherein the dispenser holding assembly defines a spherical side surface extending from the bottom surface and defining a spherical receiving sleeve, the spherical receiving sleeve configured to receive the bottom portion of the dispenser.

9. The handle assembly of claim 8, further including a plurality of raised panels extending from the spherical side surface, the plurality of raised panels spaced apart from each other and configured to securely and removably hold the dispenser in the spherical receiving sleeve of the dispenser holding assembly.

10. The handle assembly of claim 9, further including at least one orifice formed through the spherical side surface, the at least one orifice configured to increase a flexibility of the spherical side surface.

11. The handle assembly of claim 1, further including at least one pivot arm at the distal end of the second arm member, and a pivot extension extending from the dispenser holding assembly, the pivot extension pivotally coupled to the at least one pivot arm and configured to allow pivoting of the dispenser holding assembly with respect to the second arm member.

12. The handle assembly of claim 1, further including a proximal end portion defined by the hand-grip, and an open proximal end defined at the proximal end portion of the hand-grip, the open proximal end of the hand-grip configured to receive the second arm member therein.

13. The handle assembly of claim 1, further including a proximal end portion defined by the hand-grip, a closed proximal end defined at the proximal end portion of the hand-grip.

14. The handle assembly of claim 1, further including a locking mechanism configured to prevent pivoting of the second arm member with respect to the first arm member, the locking mechanism including a first stop member configured to be releasably engaged with the first arm member and a second stop member configured to be releasably engaged with the second arm member.

15. The handle assembly of claim 1, further including a locking mechanism configured to prevent pivoting of the second arm member with respect to the first arm member, the locking mechanism including at least one stop member, the at least one stop member configured to prevent pivoting of the first arm member with respect to the second arm member.

16. The handle assembly of claim 1, further including at least one pivot arm at the distal end of the second arm member, and a pivot extension extending from the dispenser holding assembly, the pivot extension pivotally coupled to the at least one pivot arm and configured to allow pivoting of the dispenser holding assembly with respect to the second arm member, the pivot extension including a plurality of stop members configured to prevent pivoting of the dispenser holding assembly with respect to the second arm member.

* * * * *